United States Patent
Zhang et al.

(10) Patent No.: US 12,004,205 B2
(45) Date of Patent: Jun. 4, 2024

(54) SIDELINK COMMUNICATION METHOD, NETWORK DEVICE, AND TERMINAL DEVICE

(71) Applicant: HUAWEI TECHNOLOGIES CO., LTD., Shenzhen (CN)

(72) Inventors: Lili Zhang, Beijing (CN); Junwei Wang, Shenzhen (CN); Chao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 17/360,228

(22) Filed: Jun. 28, 2021

(65) Prior Publication Data

US 2021/0329651 A1    Oct. 21, 2021

Related U.S. Application Data

(63) Continuation of application No. PCT/CN2019/126012, filed on Dec. 17, 2019.

(30) Foreign Application Priority Data

Dec. 29, 2018    (CN) .......................... 201811641230.0

(51) Int. Cl.
*H04W 72/53*    (2023.01)
*H04W 72/044*    (2023.01)
(Continued)

(52) U.S. Cl.
CPC ....... *H04W 72/53* (2023.01); *H04W 72/0446* (2013.01); *H04W 72/0466* (2013.01);
(Continued)

(58) Field of Classification Search
CPC . H04W 76/11; H04W 72/23; H04W 72/0446; H04L 12/28
(Continued)

(56) References Cited

U.S. PATENT DOCUMENTS 11,743,865 B2 *    8/2023    Abotabl ................ H04W 72/02
                                                                370/329
2017/0041924 A1    2/2017    Glund et al.
(Continued)

FOREIGN PATENT DOCUMENTS

CN    101494904 A    7/2009
CN    106797635 A    5/2017
(Continued)

OTHER PUBLICATIONS

CATT, "Further details of common control signaling," 3GPP TSG RAN WG1 Meeting #88, Athens, Greece, Feb. 13-17, 2017, R1-1702091; 5 total pages.
(Continued)

*Primary Examiner* — Dang T Ton
(74) *Attorney, Agent, or Firm* — Rimon PC

(57) ABSTRACT

This application provides a sidelink communication method, a terminal device, and a network device. In the sidelink communication method, a network device determines downlink control information. The downlink control information carries first indication information. The first indication information is used to indicate slot formats respectively corresponding to the terminal devices in K terminal device pairs. A terminal device pair is two terminal devices performing sidelink communication between themselves. K is a positive integer. The network device sends the downlink control information. In the technical solutions provided in this application, the network device may configure a slot format for the terminal devices in the terminal device pairs.

17 Claims, 16 Drawing Sheets

(51) Int. Cl.
*H04W 72/0446* (2023.01)
*H04W 72/23* (2023.01)
*H04W 76/11* (2018.01)
*H04W 92/18* (2009.01)

(52) U.S. Cl.
CPC ............ *H04W 72/23* (2023.01); *H04W 76/11* (2018.02); *H04W 92/18* (2013.01)

(58) Field of Classification Search
USPC ................................ 370/329, 400, 402, 403
See application file for complete search history.

(56) References Cited

U.S. PATENT DOCUMENTS

| | | | |
|---|---|---|---|
| 2018/0309513 A1 | 10/2018 | Kim et al. | |
| 2018/0367289 A1 | 12/2018 | Kim et al. | |
| 2018/0376476 A1 | 12/2018 | Lee et al. | |
| 2023/0269752 A1* | 8/2023 | Li ......................... | H04L 5/0053 370/329 |

FOREIGN PATENT DOCUMENTS

| | | |
|---|---|---|
| CN | 107683575 A | 2/2018 |
| CN | 108352967 A | 7/2018 |
| CN | 108419296 A | 8/2018 |
| CN | 108600974 A | 9/2018 |
| CN | 108809614 A | 11/2018 |
| CN | 108811156 A | 11/2018 |
| CN | 108964853 A | 12/2018 |
| CN | 109075956 A | 12/2018 |
| CN | 109076578 A | 12/2018 |
| WO | 2018004323 A1 | 1/2018 |
| WO | 2018058443 A1 | 4/2018 |
| WO | 2018175768 A1 | 9/2018 |
| WO | 2018202059 A1 | 11/2018 |
| WO | 2018228556 A1 | 12/2018 |

OTHER PUBLICATIONS

R1-1811335, NTT Docomo, Inc., Sidelink resource allocation mechanism, 3GPP TSG RAN WG1 Meeting #94bis, Chengdu, China, Oct. 8-12, 2018, total 10 pages.

* cited by examiner

SIDELINK COMMUNICATION METHOD, NETWORK DEVICE, AND TERMINAL DEVICE

CROSS-REFERENCE TO RELATED APPLICATIONS

This application is a continuation of International Application No. PCT/CN2019/126012, filed on Dec. 17, 2019, which claims priority to Chinese Patent Application No. 201811641230.0, filed on Dec. 29, 2018. The disclosures of the aforementioned applications are hereby incorporated by reference in their entireties.

TECHNICAL FIELD

This application relates to the field of communications technologies, and more specifically, to a sidelink communication method, a network device, and a terminal device.

BACKGROUND

Communication manners in an Internet of vehicles (e.g. vehicle to everything, V2X) system are collectively referred to as V2X communication (X represents anything). For example, the V2X communication includes vehicle-to-vehicle (V2V) communication, vehicle-to-infrastructure (V2I) communication, vehicle-to-pedestrian (V2P) communication, or vehicle-to-network (V2N) communication. Communication between terminal devices in the V2X system is generally referred to as sidelink (SL) communication.

When a terminal device communicates with a network device or another terminal device, the network device configures a slot format for the terminal device in time domain. The slot format can indicate, to the terminal device, different transmission statuses of the terminal device on a plurality of symbols in one slot. The transmission statuses may be an uplink transmission status, a downlink transmission status, or a flexible transmission status. Specifically, in a fifth generation new radio (5G NR) system, the network device configures the slot format (SF) of the slot by using semi-static signaling or dynamic signaling. Dynamic configuration indicates that the slot format is configured by using a slot format indicator (SFI) in downlink control information (DCI) signaling.

How to determine a slot format for a terminal device in a terminal device pair and to complete sidelink communication between terminal devices in the terminal device pair becomes an urgent problem to be resolved.

SUMMARY

This application provides a sidelink communication method, a network device, and a terminal device. The network device can configure a slot format for a terminal device in a terminal device pair, to complete sidelink communication between terminal devices in the terminal device pair.

According to a first aspect, a sidelink communication method is provided. In the method, a network device determines downlink control information. The downlink control information carries first indication information. The first indication information is used to indicate slot formats respectively corresponding to terminal devices in K terminal device pairs. The terminal device pair is two terminal devices performing sidelink communication. K is a positive integer. The network device sends the downlink control information.

In the sidelink communication method in an embodiment of this application, the downlink control information delivered by the network device carries the first indication information. The first indication information is used to indicate the slot formats respectively corresponding to the terminal devices in the K terminal device pairs. In this way, a corresponding slot format can be configured for the terminal device in the terminal device pair, to implement sidelink communication between the terminal devices in the terminal device pair.

With reference to the first aspect, in some implementations of the first aspect, the first indication information includes K information segments, one of the K information segments is used to indicate a slot format corresponding to at least one terminal device in one of the K terminal device pairs, and the K information segments are in a one-to-one correspondence with the K terminal device pairs.

In the sidelink communication method in this embodiment of this application, the first indication information may include the K information segments, and each information segment corresponds to one terminal device pair and is used to determine a slot format corresponding to at least one terminal device in the corresponding terminal device pair.

It should be understood that the information segment in an embodiment of this application indicates a part of information included in the first indication information carried in the downlink control information, and may also be referred to as an information block, an information domain, an information location, an information unit or field, or the like.

With reference to the first aspect, in some implementations of the first aspect, a first terminal device simultaneously belongs to the K terminal device pairs. The first indication information includes N information segments. One information segment is used to indicate a slot format corresponding to one terminal device. The N information segments are in a one-to-one correspondence with N terminal devices. The N terminal devices are terminal devices in the K terminal device pairs. The N terminal devices include the first terminal device. N is a positive integer greater than K.

In the sidelink communication method in an embodiment of this application, the first indication information may include the N information segments, and each information segment corresponds to one terminal device and is used to determine a slot format corresponding to the corresponding terminal device. Based on different scenarios of terminal device pairs, different flexible format selection solutions of downlink control information are provided.

With reference to the first aspect, in some implementations of the first aspect, the one-to-one correspondence between the K information segments and the K terminal device pairs is preconfigured, or the method further includes: The network device sends a second message to the terminal devices in the K terminal device pairs. The second message includes the one-to-one correspondence between the K information segments and the K terminal device pairs.

In the sidelink communication method in an embodiment of this application, the network device may establish the one-to-one correspondence between the K information segments and the K terminal device pairs, and notify the terminal devices in the K terminal device pairs of the one-to-one correspondence between the K information segments and the K terminal device pairs by using the second message. Alternatively, the one-to-one correspondence between the K information segments and the K terminal device pairs is preconfigured in the network device and/or the terminal devices in the K terminal device pairs, so that the terminal devices in the K terminal device pairs can learn of the one-to-one correspondence between the K information segments and the K terminal device pairs, and obtain corresponding information segments based on the correspondence and terminal device pairs to which the terminal devices belong.

It should be understood that, in this embodiment of this application, the one-to-one correspondence between the K information segments and the K terminal device pairs may be a one-to-one correspondence between the K information segments and identifiers of the K terminal device pairs. The identifier of the terminal device pair is information that can be used to uniquely determine the terminal device pair in a sidelink communications system.

With reference to the first aspect, in some implementations of the first aspect, that one information segment is used to indicate a slot format corresponding to at least one terminal device in one terminal device pair includes that one information segment is used to indicate a slot format corresponding to an initiating terminal device in one terminal device pair; one information segment is used to indicate a slot format corresponding to a receiving terminal device in one terminal device pair; or one information segment is used to indicate a slot format corresponding to an initiating terminal device and a slot format corresponding to a receiving terminal device in one terminal device pair.

In the sidelink communication method in an embodiment of this application, an information segment may be used to indicate a slot format corresponding to at least one terminal device in two terminal devices in a terminal device pair corresponding to the information segment.

It should be understood that the information segment in this embodiment of this application may be used to indicate the slot format corresponding to the terminal device, and the information segment may include slot format indicator information corresponding to the corresponding terminal device.

With reference to the first aspect, in some implementations of the first aspect, that one information segment is used to indicate a slot format corresponding to an initiating terminal device and a slot format corresponding to a receiving terminal device in one terminal device pair includes that one information segment includes a first part and a second part, where the first part is used to indicate the slot format corresponding to the initiating terminal device, and the second part is used to indicate the slot format corresponding to the receiving terminal device.

In the sidelink communication method in an embodiment of this application, an information segment may be divided into two parts. Each part corresponds to one terminal device in a terminal device pair corresponding to the information segment, and includes SFI information of the terminal device. In other words, after obtaining the information segment corresponding to an identifier of the terminal device pair to which the terminal device belongs, the terminal device may further determine slot format indicator information of the terminal device based on a correspondence between the terminal device and the part in the information segment.

With reference to the first aspect, in some implementations of the first aspect, the one-to-one correspondence between the N information segments and the N terminal devices is preconfigured, or the method further includes: The network device sends a third message to the N terminal devices. The third message includes the one-to-one correspondence between the N information segments and the N terminal devices.

In the sidelink communication method in an embodiment of this application, the network device may establish the one-to-one correspondence between the N information segments and the N terminal devices, and notify the N terminal devices of the one-to-one correspondence between the N information segments and the N terminal devices by using the third message. Alternatively, the one-to-one correspondence between the N information segments and the N terminal devices is preconfigured in the network device and/or the N terminal devices, so that the N terminal devices can learn of the one-to-one correspondence between the N information segments and the N terminal devices, and obtain corresponding information segments based on the correspondence and identifiers of the terminal devices.

With reference to the first aspect, in some implementations of the first aspect, the first terminal device can learn of a slot format corresponding to another terminal device in the N terminal devices.

In the sidelink communication method in an embodiment of this application, in order that sidelink communication is performed between the first terminal device simultaneously belonging to the plurality of terminal device pairs and another terminal device in the plurality of terminal device pairs, the first terminal device can learn of the slot format corresponding to the another terminal device in the plurality of terminal device pairs.

With reference to the first aspect, in some implementations of the first aspect, before the network device sends the downlink control information, the method further includes: The network device scrambles the downlink control information by using a first identifier. The first identifier is preconfigured or is notified by using semi-static signaling.

In the sidelink communication method in this embodiment of this application, the network device scrambles the sent downlink control information based on the first identifier. In order to enable the terminal device receiving the downlink control information to parse the downlink control information, in this application, the first identifier may be sent to the terminal devices in the K terminal device pairs by using the semi-static signaling, or the first identifier is preconfigured.

With reference to the first aspect, in some implementations of the first aspect, the downlink control information further includes second indication information. The second indication information is used to identify the K terminal device pairs.

In the sidelink communication method in an embodiment of this application, the downlink control information may carry the second indication information to notify the terminal device receiving the downlink control information. The information segment in the first indication information may be used to determine the slot format of the specific terminal device pair.

With reference to the first aspect, in some implementations of the first aspect, the second indication information includes an identifier of a start terminal device pair in the K terminal device pairs, or the second indication information includes an identifier of each of the K terminal device pairs.

In the sidelink communication method in an embodiment of this application, the second indication information may be only the identifier indicating the start terminal device pair in the K terminal device pairs, so that the K terminal device pairs can be determined based on the identifier of the start terminal device pair; or the second indication information may include the identifier of each of the K terminal device pairs.

With reference to the first aspect, in some implementations of the first aspect, the method further includes: The network device sends third indication information to the terminal devices in the K terminal device pairs. The third indication information is used to indicate first search space. The first search space is search space for detecting the downlink control information.

In the sidelink communication method in this embodiment of this application, to simplify the process in which the terminal device detects the downlink control information, the network device determines the first search space, and notifies the terminal device of the first search space by using the third indication information.

According to a second aspect, a sidelink communication method is provided, including: A terminal device receives downlink control information sent by a network device. The downlink control information carries first indication information. The terminal device is any terminal device in the K terminal device pairs. The first indication information is used to indicate slot formats respectively corresponding to the terminal devices in the K terminal device pairs. The terminal device pair is two terminal devices performing sidelink communication. K is a positive integer. The terminal device parses the downlink control information.

In the sidelink communication method in an embodiment of this application, the downlink control information received by the terminal device carries the first indication information. The first indication information is used to indicate the slot formats respectively corresponding to the terminal devices in the K terminal device pairs. In this way, a slot format corresponding to the terminal device in the terminal device pair can be configured for the terminal device.

With reference to the second aspect, in some implementations of the second aspect, the first indication information includes K information segments, one of the K information segments is used to indicate a slot format corresponding to at least one terminal device in one of the K terminal device pairs, and the K information segments are in a one-to-one correspondence with the K terminal device pairs.

In the sidelink communication method in an embodiment of this application, the first indication information may include the K information segments, and each information segment corresponds to one terminal device pair and is used to determine a slot format corresponding to at least one terminal device in the corresponding terminal device pair.

With reference to the second aspect, in some implementations of the second aspect, a first terminal device simultaneously belongs to the K terminal device pairs. The first indication information includes N information segments. One information segment is used to indicate a slot format corresponding to one terminal device. The N information segments are in a one-to-one correspondence with N terminal devices. The N terminal devices are terminal devices in the K terminal device pairs. The N terminal devices include the first terminal device. N is a positive integer greater than K.

In the sidelink communication method in this embodiment of this application, the first indication information may include the N information segments, and each information segment corresponds to one terminal device and is used to determine a slot format corresponding to the corresponding terminal device. Based on different scenarios of terminal device pairs, different flexible format selection solutions of downlink control information are provided.

With reference to the second aspect, in some implementations of the second aspect, the one-to-one correspondence between the K information segments and the K terminal device pairs is preconfigured, or the method further includes: The terminal device receives a second message sent by the network device. The second message includes the one-to-one correspondence between the K information segments and the K terminal device pairs.

In the sidelink communication method in an embodiment of this application, the terminal device receives the second message including the one-to-one correspondence between the K information segments and the K terminal device pairs. Alternatively, the one-to-one correspondence between the K information segments and the K terminal device pairs is preconfigured in the network device and/or the terminal devices in the K terminal device pairs, so that the terminal devices in the K terminal device pairs can learn of the one-to-one correspondence between the K information segments and the K terminal device pairs, and obtain corresponding information segments based on the correspondence and terminal device pairs to which the terminal devices belong.

With reference to the second aspect, in some implementations of the second aspect, that one information segment is used to indicate a slot format corresponding to at least one terminal device in one terminal device pair includes that one information segment is used to indicate a slot format corresponding to an initiating terminal device in one terminal device pair; one information segment is used to indicate a slot format corresponding to a receiving terminal device in one terminal device pair; or one information segment is used to indicate a slot format corresponding to an initiating terminal device and a slot format corresponding to a receiving terminal device in one terminal device pair.

In the sidelink communication method in an embodiment of this application, an information segment may be used to indicate a slot format corresponding to at least one terminal device in the two terminal devices in a terminal device pair corresponding to the information segment.

With reference to the second aspect, in some implementations of the second aspect, that one information segment is used to indicate a slot format corresponding to an initiating terminal device and a slot format corresponding to a receiving terminal device in one terminal device pair includes that one information segment includes a first part and a second part, where the first part is used to indicate the slot format corresponding to the initiating terminal device, and the second part is used to indicate the slot format corresponding to the receiving terminal device.

In the sidelink communication method in an embodiment of this application, an information segment may be divided into two parts. Each part corresponds to one terminal device in a terminal device pair corresponding to the information segment, and includes SFI information of the terminal device. In other words, after obtaining the information segment corresponding to an identifier of the terminal device pair to which the terminal device belongs, the terminal device may further determine slot format indicator information of the terminal device based on a correspondence between the terminal device and the corresponding part in the information segment.

With reference to the second aspect, in some implementations of the second aspect, the one-to-one correspondence between the N information segments and the N terminal devices is preconfigured, or the method further includes: The terminal device receives a third message sent by the network device. The third message includes the one-to-one correspondence between the N information segments and the N terminal devices.

In the sidelink communication method in an embodiment of this application, the terminal device receives the third message including the one-to-one correspondence between the N information segments and the N terminal devices. Alternatively, the one-to-one correspondence between the N information segments and the N terminal devices is preconfigured in the network device and/or the N terminal devices, so that the N terminal devices can learn of the one-to-one correspondence between the N information segments and the N terminal devices, and obtain corresponding information segments based on the correspondence and identifiers of the terminal devices.

With reference to the second aspect, in some implementations of the second aspect, when the terminal device is the first terminal device, the terminal device determines, based on the one-to-one correspondence between the N information segments and the N terminal devices, a slot format corresponding to another terminal device in the N terminal devices.

In the sidelink communication method in an embodiment of this application, in order that sidelink communication is performed between the first terminal device simultaneously belonging to the plurality of terminal device pairs and another terminal device in the plurality of terminal device pairs, the first terminal device can learn of the slot format corresponding to the other terminal device in the plurality of terminal device pairs.

With reference to the second aspect, in some implementations of the second aspect, before the terminal device receives the downlink control information sent by the network device, the method further includes: The terminal device obtains a first identifier. The first identifier is used to scramble the downlink control information. That the terminal device obtains a first identifier includes: The first identifier is preconfigured; or the terminal device receives semi-static signaling sent by the network device. The semi-static signaling carries the first identifier.

In the sidelink communication method in an embodiment of this application, the terminal device receives the semi-static signaling delivered by the network device to obtain the first identifier for scrambling the downlink control information. Alternatively, the first identifier for scrambling the downlink control information is preconfigured.

With reference to the second aspect, in some implementations of the second aspect, the downlink control information further includes second indication information. The second indication information is used to identify the K terminal device pairs.

In the sidelink communication method in an embodiment of this application, the downlink control information may carry the second indication information, so that the terminal device determines that the first indication information indicates a slot format corresponding to a terminal device in a specific terminal device pair.

With reference to the second aspect, in some implementations of the second aspect, the second indication information includes an identifier of a start terminal device pair in the K terminal device pairs, or the second indication information includes an identifier of each of the K terminal device pairs.

In the sidelink communication method in an embodiment of this application, the second indication information may be the identifier of the start terminal device pair in the K terminal device pairs, so that the K terminal device pairs can be determined based on the identifier of the start terminal device pair; or the second indication information may include the identifier of each of the K terminal device pairs.

With reference to the second aspect, in some implementations of the second aspect, the method further includes: The terminal device receives third indication information sent by the network device. The third indication information is used to indicate first search space. The first search space is a search space for detecting the downlink control information.

In the sidelink communication method in an embodiment of this application, to simplify the process in which the terminal device detects the downlink control information, the terminal device receives the third indication information, and determines the first search space for detecting the downlink control information.

According to a third aspect, a network device is provided. The network device may be configured to perform an operation of the network device in the first aspect and any possible implementation of the first aspect. Specifically, the network device may be the network device in the first aspect including parts (means) configured to perform corresponding steps or functions described in the first aspect. The steps or the functions may be implemented by using software, hardware, or a combination of the software and the hardware.

According to a fourth aspect, a terminal device is provided. The terminal device may be configured to perform an operation of the terminal device in the second aspect and any possible implementation of the second aspect. Specifically, the terminal device may include parts (means) configured to perform corresponding steps or functions described in the second aspect. The steps or the functions may be implemented by using software, hardware, or a combination of the software and the hardware.

According to a fifth aspect, a sidelink communications apparatus is provided and includes a processor and a memory. The memory is configured to store a computer program, and the processor is configured to: invoke the computer program from the memory and run the computer program, so that the sidelink communications apparatus performs the sidelink communication method in any possible implementation of the first aspect or the second aspect.

In a possible implementation, there are one or more processors, and there are one or more memories.

In a possible implementation, the memory may be integrated with the processor, or the memory and the processor are separately disposed.

Optionally, the sidelink communications apparatus further includes a transmitter (transmitter) and a receiver (receiver).

According to a sixth aspect, a system is provided. The system includes the terminal device and the network device.

According to a seventh aspect, a computer program product is provided. The computer program product includes a computer program (which may also be referred to as code or an instruction). When the computer program is run, a computer is enabled to perform the method in any possible implementation of the first aspect or the second aspect.

According to an eighth aspect, a chip system is provided and includes a memory and a processor. The memory is configured to store a computer program, and the processor is configured to: invoke the computer program from the memory and run the computer program, so that a sidelink communications apparatus on which the chip system is installed performs the method in any possible implementation of the first aspect and the second aspect.

According to the sidelink communication method, the network device, and the terminal device in the embodiments of this application, the downlink control information delivered by the network device carries the first indication information. The first indication information is used to indicate the slot formats respectively corresponding to the terminal devices in the K terminal device pairs. In this way, the corresponding slot format can be configured for the terminal device in the terminal device pair, to complete sidelink communication between the terminal devices in the terminal device pair.

DESCRIPTION OF EMBODIMENTS

Figure 1:
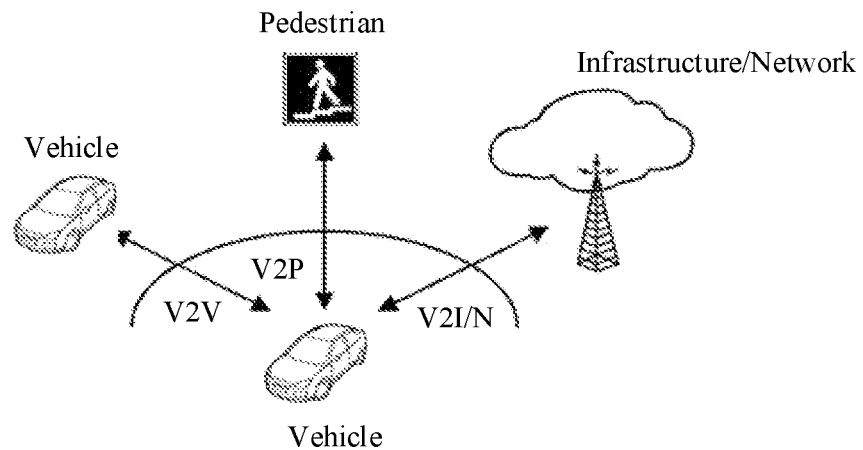
FIG. 1 is a schematic diagram of a V2X system in the current technology.

The following describes technical solutions of this application with reference to the accompanying drawings.

The technical solutions of the embodiments of this application may be applied to various communications systems, such as a global system for mobile communications (GSM), a code division multiple access (a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems for implementing service processing by using a process, for example, a Linux operating system, a Unix operating system, an Android operating system, an iOS operating system, or a Windows operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the method provided in the embodiments of this application may be performed by the terminal device or the network device, or may be performed by a function module that can invoke and execute a program in the terminal device or the network device.

In addition, aspects or features of this application may be implemented as a method, an apparatus, or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a compact disc (CD)), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry an instruction and/or data.

As the society gradually develops, vehicles are becoming more popular. Driving facilitates people's travel, but also causes adverse impact to the human society. A rapid increase in a quantity of vehicles causes a series of problems such as urban traffic congestion, frequent traffic accidents, and poor environmental quality. In aspects such as personal safety, transportation efficiency, environmental protection, and economic effects, a set of a complete intelligent transportation system (ITS) is needed. Currently, the ITS has naturally become a global hotspot.

Currently, a vehicle may promptly obtain road condition information or receive service information through a V2V, V2I, V2P, or V2N communication manner. These communication manners may be collectively referred to as V2X communication.

FIG. 1 is a schematic diagram of a V2X system in the current technology. The schematic diagram includes V2V communication, V2P communication, and V2I/N communication. As shown in FIG. 1, communication between vehicles is performed through V2V A vehicle may broadcast information about the vehicle such as a driving speed, a driving direction, a specific location, and abrupt deceleration to a surrounding vehicle, so that a driver of the surrounding vehicle can obtain the information to better learn of a traffic condition outside a line of sight, to predict a danger and further avoid the danger. Communication between the vehicle and roadside infrastructure is performed through V2I. The roadside infrastructure may provide access of various types of service information and data networks for the vehicle. Functions such as non-parking toll and in-car entertainment greatly improve traffic intelligence. The roadside infrastructure such as a roadside unit (RSU) includes two types. One type is an RSU in a terminal device type. Because the RSU is distributed on the roadside, the RSU in the terminal device type is in a non-mobile state, and mobility does not need to be considered. The other type is an RSU in a network device type. The RSU in the network device type may provide timing synchronization and resource scheduling for a vehicle communicating with the network device. Vehicle-to-human (for example, vehicle-to-pedestrian, vehicle-to-cyclist, vehicle-to-driver, or vehicle-to-passenger) communication is performed through V2P. Vehicle-to-network communication is performed through V2N. V2N and V2I may be collectively referred to as V2I/N.

It should be understood that FIG. 1 is merely an example schematic diagram for describing a V2X system, and constitutes no limitation on this application. For example, there may be a plurality of vehicles, pedestrians, and infrastructure whose quantities are not those shown in FIG. 1.

Figure 2:
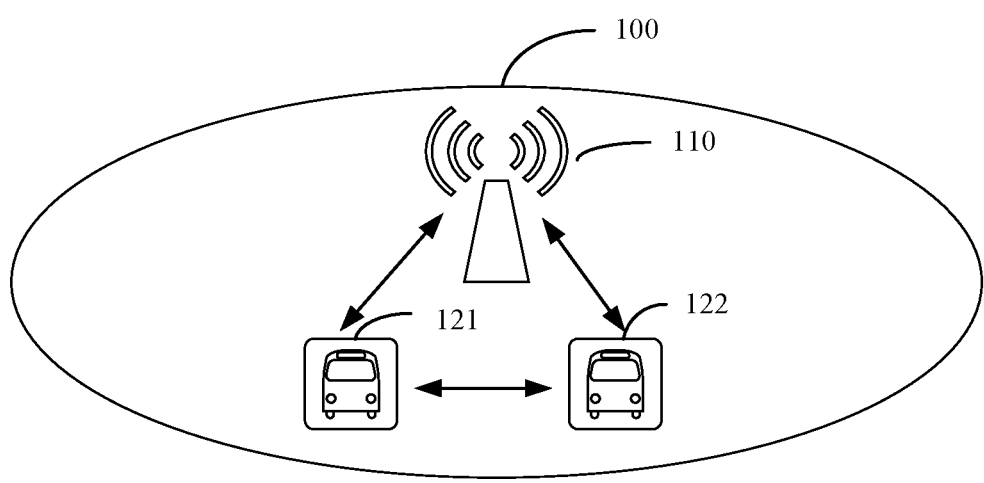
FIG. 2 is a schematic block diagram of a communications system to which an embodiment of this application is applicable.

FIG. 1 simply describes the V2X system in the current technology. With reference to FIG. 2, the following simply describes a scenario to which an implementation of this application is applicable.

FIG. 2 is a schematic block diagram of a communications system to which an embodiment of this application is applicable. As shown in FIG. 2, in the communications system 100, before data transmission, a terminal device 121 and a network device 110 may determine, through signaling interworking, a resource used for data transmission with a terminal device 122. Then, the terminal device 121 communicates with the terminal device 122 by using the determined resource. Alternatively, before data transmission, a terminal device 122 and a network device 110 may determine, through signaling interworking, a resource used for data transmission with a terminal device 121. Then, the terminal device 122 communicates with the terminal device 121 by using the determined resource. In other words, this embodiment of this application is applied to an application scenario of sidelink data transmission.

It should be understood that FIG. 2 is merely a schematic diagram and constitute no limitation on the protection scope of this application. For example, a quantity of terminal devices shown in FIG. 2 is merely an example.

It should be further understood that, in this application, communication between terminal devices in the foregoing V2X system is referred to as sidelink communication and constitute no limitation on this application. For example, the sidelink communication may be alternatively referred to as side link communication, straight-through link communication, secondary link communication, or the like. In addition, this is not necessarily limited to the V2X system. In another scenario, communication between terminal devices may also be referred to as sidelink communication.

FIG. 2 describes a scenario to which an embodiment of this application is applicable. For ease of understanding of the technical solutions of this application, the following briefly describes several basic concepts in the technical solutions in this application.

1. Slot

First, it should be understood that 5G NR mobile communication needs to have higher performance than 4th generation (4G) mobile communication. The version 15 protocol in the 5G new radio access technology (5G NR RAT) defines a new air interface access technology. The air interface access technology supports a user experience rate of 0.1 gigabit per second (Gbps) to 1 gigabit per second, density of one million connections per square kilometer, a millisecond-level end-to-end latency, traffic density of tens of terabit per second (Tbps) per square kilometer, mobility of over 500 km per hour, and a peak rate of tens of Gbps. The user experience rate, the density of connections, and the latency are three basic 5G performance indicators. In addition, network device deployment and operation efficiency need to be greatly improved in 5G. In comparison with 4G, spectrum efficiency is improved by 5 to 15 times, and energy efficiency and costs efficiency are improved by more than 100 times.

Three 5G NR application scenarios include enhanced mobile broadband (eMBB), massive machine-type communications (mMTC), and ultra-reliable and low-latency communications (URLLC).

A URLLC application scenario includes driverless, industrial control, and the like. The URLLC application scenario requires low latency and high reliability. Low latency specifically requires an end-to-end delay of 0.5 ms and a round-trip delay of 1 ms for air interface information exchange. High reliability requires that a block error ratio (BLER) reaches $10^{\wedge}(-5)$, that is, a proportion of correctly receiving data packets reaches 99.999%.

In 5G NR, a plurality of subcarrier spacings are introduced. Different carriers may have different subcarrier spacings. A baseline value is 15 kHz. The subcarrier spacing may be 15 kHz*2^n, where n is an integer. There are a maximum of eight values from 3.75 kHz, 7.5 kHz, to 480 kHz. In correspondence to different subcarrier spacings, there are a plurality of symbol lengths and slot lengths, as shown in the following Table 1.

control information (DCI)). Alternatively, the symbol may be a gap, or a guard period (GP).

Specifically, a transmission status of each symbol included in the slot is any one of the following:

There are three statuses: an uplink (UL) transmission status, a downlink (DL) transmission status, and an unknown status, which may be denoted as UL/DL/X (or, denoted as U/D/X for short). X is referred to as an unknown status or a flexible status. The terminal device neither receives nor sends information on a symbol corresponding to the X state. X may also be referred to as F or U.

For example, a slot format_0 indicates that transmission statues of 14 symbols included in one slot are all the downlink transmission status; a slot format_1 indicates that transmission statues of 14 symbols included in one slot are all the uplink transmission status; and a slot format_2 indicates that transmission statuses of 14 symbols included in one slot are neither the uplink transmission status nor the uplink transmission status. There may be a maximum of 256 slot formats in 5G NR. The slot formats are not listed herein.

Further, quantities of uplink transmission symbols, quantities of downlink transmission symbols, or quantities of flexible symbols included in different slot formats are different.

TABLE 1

| Subcarrier spacing | Symbol length | | | | | | | | | | | | | | | | | | | |
|---|---|---|---|---|---|---|---|---|---|---|---|---|---|---|---|---|---|---|---|---|
| f0 | S0 | | | | S1 | | | | S2 | | | | S3 | | | | S4 | | | |
| f1 | S0 | | S1 | | S2 | | S3 | | S4 | | S5 | | S6 | | S7 | | S8 | | S9 | |
| f2 | S0 | S1 | S2 | S3 | S4 | S5 | S6 | S7 | S8 | S9 | S10 | S11 | S12 | S13 | S14 | S15 | S16 | S17 | S18 | S19 |

S in Table 1 indicates a symbol. It may be learned from the table that a symbol length corresponding to a subcarrier spacing of f0 is twice a symbol length corresponding to a subcarrier spacing of f1, and is four times a symbol length corresponding to a subcarrier spacing of f2.

It should be understood that Table 1 is merely an example table, and is used to describe that a plurality of different symbol lengths correspond to different subcarrier spacings. This constitutes no limitation on this application.

There may also be different slot types of slots. Different slot types include different quantities of symbols. For example, a quantity of symbols included in a mini slot is less than 7. For example, a quantity of symbols included in a mini slot is one symbol, two symbols, four symbols, or the like. A quantity of symbols included in a common slot is seven symbols or 14 symbols.

The following describes in detail the sidelink communication method in this application by using an example in which the common slot includes 14 symbols. However, a specific form of a slot is not limited in this embodiment of this application.

2. Slot Format

In time domain, for example, in 5G NR, one slot may include at least one function of a downlink transmission symbol, a flexible symbol, an uplink transmission symbol, and the like. Different slots form and implement different functions. Compositions of different slots are referred to as different slot format (SF). The downlink transmission symbol is used for downlink transmission, the uplink transmission symbol is used for uplink transmission, and the flexible symbol is used for direction configurability (a transmission direction may be configured and changed through radio resource control (RRC) specific to a terminal device, or a transmission direction may be changed by using downlink 3. Slot Format Configuration 5G NR supports semi-static or dynamic slot format configuration.

1. Semi-Static Slot Format Configuration

Specifically, a network device sends semi-static signaling to a terminal device. The semi-static signaling is used for slot format configuration. For example, RRC signaling is used to notify a terminal device in a time period or with a period of a time period of transmission statuses of symbols included in each slot. The semi-static signaling may be cell-specific. In other words, all terminal devices in a cell receive the semi-static signaling to implement slot format configuration. Alternatively, the semi-static signaling may be dedicated signaling of a terminal device. In other words, the terminal device receives the semi-static signaling to implement slot format configuration.

2. Dynamic Slot Format Configuration

5G NR also supports using DCI signaling to notify a terminal device of a slot format of one or more slots in a time period or with a period of a time period. The DCI signaling includes slot format indicator (SFI) information, and is therefore referred to as dynamic SFI signaling.

Specifically, the SFI information is delivered by using DCI2_0 information. The DCI2_0 information may cover an unknown status of a transmission status of a symbol in the semi-static slot format configuration. The DCI2_0 is a downlink control information format that is specified in a protocol and that is used to carry the SFI information.

In addition, a plurality of symbol status combinations of a plurality of slots are further predefined in 5G NR. A table in which the combinations are located is referred to as a terminal device-specific table. Specifically, a network device configures a slot format combination of one or more slots by using RRC signaling. An entry identity (entry ID) of the combination may be used to indicate a specific slot format. In addition, the DCI signaling may dynamically indicate the slot format combination of the one or more slots. A maximum value of the entry ID (max Nrof Slot Format Combinations Per Set) in the specific table specific table is 512, and a maximum value of a slot quantity (max Nrof Slot Formats Per Combination) of each entry is 256.

The following briefly describes the specific table specific table with reference to Table 2. Table 2 is a terminal device-specific table specific table.

TABLE 2

| Entry ID | Slot 1 | Slot 2 | Slot 3 | ... | Slot m | ... | Slot n | ... | Slot 256 |
|---|---|---|---|---|---|---|---|---|---|
| 1 | s1 | s2 | s3 | ... | sm | | | | |
| 2 | s1 | s2 | s3 | ... | sm | ... | sn | | |
| ... | | | | | | | | | |
| 122 | s1 | s2 | s3 | ... | sm | ... | sn | ... | s256 |
| ... | | | | | | | | | |
| 512 | s1 | s2 | s3 | ... | sm | | | | |

In Table 2, s indicates a symbol, and n and m are identifiers of different symbols.

First, the network device delivers configuration information of an entry ID and a specific slot format table corresponding to the entry ID by using the RRC signaling. A horizontal axis shows different slots in the combination, and a vertical axis shows entry IDs. Table 2 includes a possible slot format combination of each entry.

Then, the configuration corresponding to a carrier indicated by using different DCI signaling is an entry ID in the table. The DCI signaling is carried on a group common-physical downlink control channel (GC-PDCCH). Each piece of SFI information carried in the DCI signaling is an entry ID corresponding to one slot format combination. A total of 16 pieces of SFI information may be carried in the DCI signaling. The SFI information may be understood as an SFI index (index). The network device configures the terminal device to periodically detect the GC-PDCCH and to receive the DCI signaling carrying the SFI. The period is referred to as a monitor period.

4. Terminal Device Pair

In a V2X system, generally, one terminal device and another terminal device form a pair. When sidelink communication, or referred to as unicast communication, is performed between the terminal devices in the pair, the pair including the two terminal devices is referred to as the terminal device pair, and is also referred to as a unicast pair. There may be a plurality of unicast pairs in the V2X system.

In the following, the unicast pair and the terminal device pair described in this application refer to a terminal device set that includes two terminal devices performing sidelink communication.

FIG. 3 is a schematic diagram of a terminal device pair according to an embodiment of this application. The schematic diagram includes a terminal device #A to a terminal device #F.

Figure 3A:
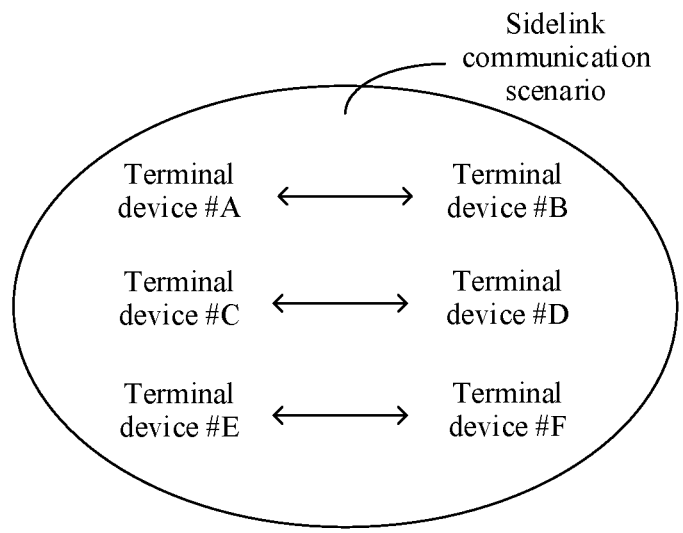
FIG. 3(a) to FIG. 3(c) are schematic diagrams of terminal device pairs according to an embodiment of this application.

Specifically, as shown in FIG. 3(a), the terminal device #A and a terminal device #B are two terminal devices performing sidelink communication in a terminal device pair; a terminal device #C and a terminal device #D are two terminal devices performing sidelink communication in a terminal device pair; and a terminal device #E and the terminal device #F are two terminal devices performing sidelink communication in a terminal device pair.

Figure 3B:
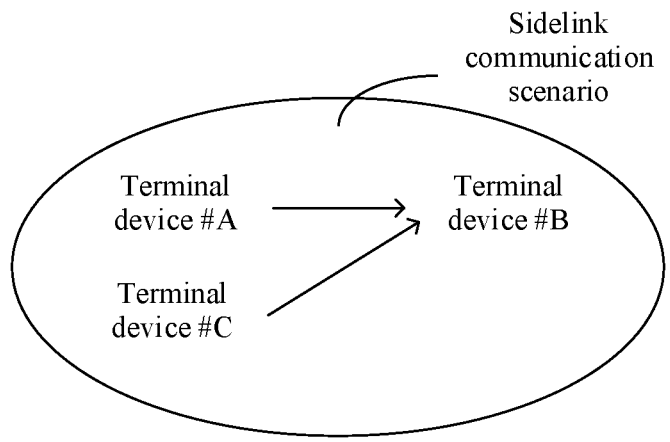

As shown in FIG. 3(b), the terminal device #A and the terminal device #B are two terminal devices performing sidelink communication in a terminal device pair; and the terminal device #C and the terminal device #B are two terminal devices performing sidelink communication in a terminal device pair. The terminal device #B belongs to both terminal device pairs, and serves as a responder terminal device in the two terminal device pairs.

Figure 3C:
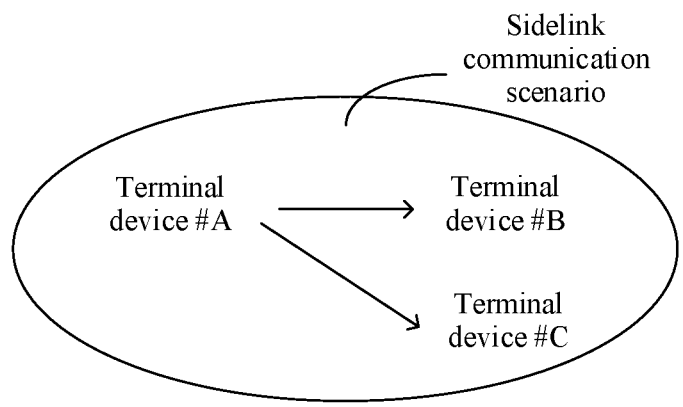

As shown in FIG. 3(c), the terminal device #A and the terminal device #B are two terminal devices performing sidelink communication in a terminal device pair; and the terminal device #A and the terminal device #C are two terminal devices performing sidelink communication in a terminal device pair. The terminal device #A belongs to both terminal device pairs, and serves as an initiating terminal device in the two terminal device pairs.

It should be understood that one terminal device may simultaneously belong to a plurality of terminal device pairs, but a quantity of terminal device pairs to which a terminal device simultaneously belongs may not exceed a threshold. For example, the threshold is set to 5 or 10.

Specifically, based on a difference between terminal devices in sending information and receiving information, the two terminal devices in one terminal device pair may be classified into initiating user equipment (I UE) that may be referred to as I for short in the following descriptions and receiving user equipment (R UE) that may be referred to as R for short in the following descriptions.

The two terminal devices in the terminal device pair are respectively referred to as I and R for simplicity. This however should not limit the protection scope of this application. For example, the sending terminal device may be further referred to as an initiating terminal device or an active terminal device; and the receiving terminal device may be further referred to as a responder terminal device or a passive terminal device.

It should be understood that a terminal device pair in this application is not limited to a terminal device pair in the V2X system. A terminal device in another sidelink communication scenario also may be included in one of the foregoing described terminal device pairs. Details are not described herein.

The foregoing briefly describes the slot format, the slot format configuration method performed by the network device in the 5G NR system, and the concept of the terminal device pair in this application. Before solutions of this application are described, an example of a slot format configuration method for sidelink communication is provided. The slot format configuration method further includes determining a symbol used for sidelink communication in a slot based on the indication of the SFI in the 5G NR system. The following briefly describes a slot format indication method for sidelink communication with reference to FIG. 4 and FIG. 5.

Figure 4:
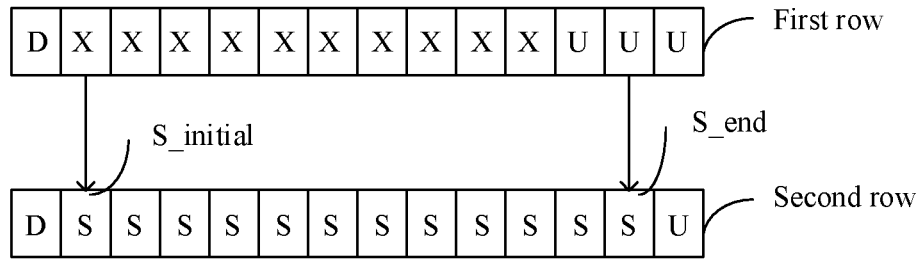
FIG. 4 is a schematic diagram of a slot format in sidelink communication.

FIG. 4 is a schematic diagram of a slot format in sidelink communication. The schematic diagram includes a slot format shown in a first row and a slot format shown in a second row.

As shown in FIG. 4, the first row in FIG. 4 is a slot format configured for the common SFI in the foregoing 5G NR. D identifies a transmission status of a symbol as a downlink transmission status, U identifies a transmission status of a symbol as an uplink transmission status, and X identifies a status of a symbol as an unknown status. For example, the foregoing X symbol may also be referred to as a flexible (F) symbol or an unknown (U) symbol, to indicate that a transmission direction in the X symbol is variable, or a transmission direction is configurable.

The second row in FIG. 4 shows that a symbol whose symbol transmission status is X or U in a slot is further identified as a sidelink (sidelink, S) communication symbol based on the slot format configuration of the common SFI in 5G NR.

When the slot format is configured as the sidelink communication slot format shown in the second row in FIG. 4, a sidelink communication slot format indicator (SL-SFI) may further indicate S_initial and S_end. S_initial indicates a start location of the S symbol, and S_end indicates an end location of the S symbol, so that an X symbol or a U symbol between S_initial and S_end is covered by an S symbol to be used for sidelink communication.

In other words, the SFI in 5G NR may separately indicate D/X/U transmission statuses of a plurality of symbols included in one slot. The SL-SFI in FIG. 4 may indicate the symbol S included in the slot. Based on resource scheduling of the network device or automatic resource selection of the terminal device, the foregoing symbol S may also be considered as an X symbol used for conversion between transmission and reception.

Figure 5:
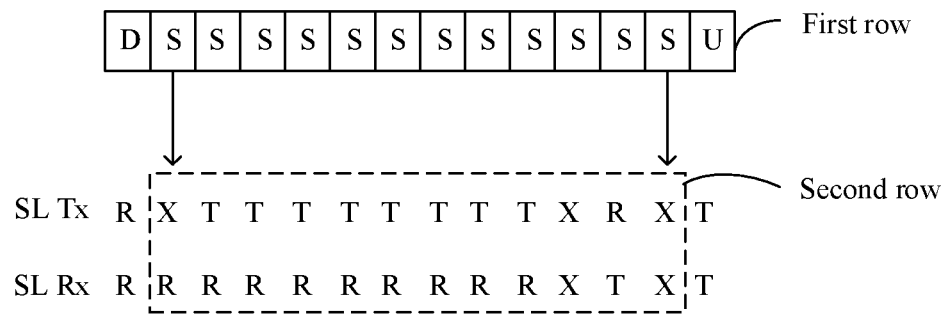
FIG. 5 is a schematic diagram of another slot format in sidelink communication.

Further, as shown in FIG. 5, S may be further identified as an SL transmission (transmit, Tx) status or an SL reception (receive, Rx) status on a sidelink.

FIG. 5 is a schematic diagram of another slot format in sidelink communication. The schematic diagram includes a slot format shown in a first row and transmission and reception slot formats shown in a second row.

The slot format shown in the first row in FIG. 5 is the slot format in the second row shown in FIG. 4, that is, 12 middle symbols are used for sidelink communication.

In the slot format shown in the second row in FIG. 5, R identifies reception, T identifiers transmission, and X identifies reception-transmission conversion. In other words, the slot format configuration methods shown in FIG. 4 and FIG. 5 may indicate slot formats corresponding to the terminal device in the sidelink communication. However, the methods do not relate to how to configure a slot format for a terminal device in a terminal device pair. The method is merely configuring a symbol used for sidelink communication in a slot based on the slot format configuration in 5G NR.

Specifically, in the V2X system, when unicast communication of the sidelink communication is performed, generally, one terminal device and another terminal device jointly form a terminal device pair (terminal device pair, namely, user equipment pair). For brevity of description, the following may be described by using a UE pair.

For example, the V2X system includes the terminal device #A to the terminal device #F shown in FIG. 3(*a*). A terminal device set including the terminal device #A and the terminal device #B is UE pair #1, a terminal device set including the terminal device #C and the terminal device #D is UE pair #2, and a terminal device set including the terminal device #E and the terminal device #F is UE pair #3.

Therefore, there may be a plurality of terminal device pairs in the V2X system. In this case, for a plurality of terminal devices separately included in the terminal device pairs, the network device needs to send SFI information to terminal devices included in each terminal device pair, and configure a slot format for each terminal device in the terminal device pair, so that the terminal devices in each terminal device pair can smoothly perform sidelink communication.

With reference to FIG. 6 to FIG. 14, the following describes in detail the sidelink communication method in the embodiments of this application. In the sidelink communication method, the network device can indicate a slot format corresponding to each terminal device in a terminal device pair, and the network device occupies fewer information resources when indicating a slot format.

Specifically, the sidelink communication method can be applied to the foregoing V2V system or another sidelink communication scenario.

Figure 6:
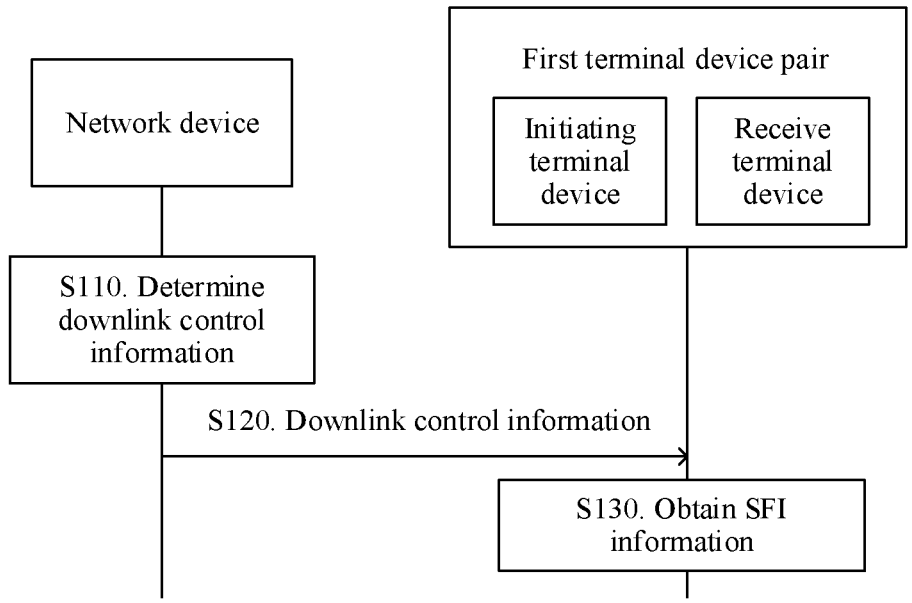
FIG. 6 is a schematic diagram of a sidelink communication method according to an embodiment of this application.

FIG. 6 is a schematic diagram of a sidelink communication method according to an embodiment of this application. The following describes the method in detail.

S110. A network device determines downlink control information. The downlink control information carries first indication information. The first indication information is used to indicate slot formats respectively corresponding to terminal devices in K terminal device pairs. K is a positive integer.

The network device determines, based on a total quantity of the terminal device pairs in a sidelink communications system, a terminal device in a terminal device pair in the sidelink communications system that needs to be configured with a slot format.

For example, the total quantity of terminal device pairs in the sidelink communications system in the coverage of the network device is M. The network device determines that a corresponding slot format needs to be configured for the terminal devices in the K terminal device pairs of the M terminal device pairs by using the downlink control information. K is a positive integer, and M is an integer greater than or equal to K.

Further, the network device determines, based on the K terminal device pairs that need to be configured with the slot formats and the terminal devices in the K terminal device pairs, a load status of the downlink control information that needs to be sent.

Specifically, the downlink control information carries the first indication information. The first indication information is used to indicate the slot formats respectively corresponding to the terminal devices in the K terminal device pairs.

For example, the first indication information includes K information segments, the K information segments are in a one-to-one correspondence with the K terminal device pairs, and one of the K information segments is used to indicate a slot format corresponding to at least one terminal device in one of the K terminal device pairs. In other words, the K information segments are respectively used to determine the slot formats corresponding to the terminal devices in the K terminal device pairs.

For example, the first terminal device simultaneously belongs to the K terminal device pairs. The first indication information includes N information segments. One information segment is used to indicate a slot format corresponding to one terminal device. The N information segments are in a one-to-one correspondence with N terminal devices. The N terminal devices are terminal devices in the K terminal device pairs. The N terminal devices include the first terminal device. N is a positive integer greater than K.

The first terminal device is any one of the N terminal devices.

It should be understood that "first" and "second" are merely intended to distinguish between different terminal devices, and are not intended to constitute any limitation on this application.

For example, the first terminal device is an initiating terminal device in all of the K terminal device pairs as shown in FIG. 3(*c*), or the first terminal device is a receiving terminal device in all of the K terminal device pairs as shown in FIG. 3(*b*), or the first terminal device is an initiating terminal device in at least one terminal device pair and a receiving terminal device in at least one terminal device pair.

With reference to FIG. 7, the following describes in detail several cases in which the information segment corresponds to the terminal device pair. FIG. 7 is a schematic diagram of a correspondence between an information segment and a terminal device pair according to an embodiment of this application.

Figure 7A:
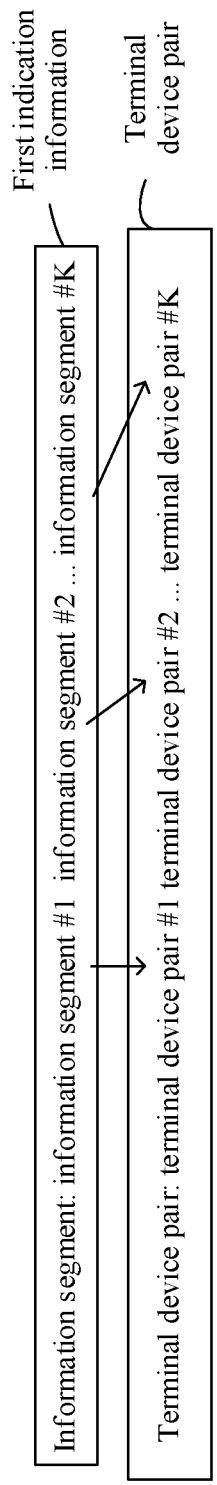
FIG. 7(a) to FIG. 7(f) are schematic diagrams of a correspondence between an information segment and a terminal device pair according to an embodiment of this application.

Case 1:

A pairing status of the terminal device pairs in the sidelink communications system in the coverage of the network device is shown in FIG. 3(a). The first indication information includes the K information segments. The K information segments are in the one-to-one correspondence with the K terminal device pairs. If K is an integer greater than 1, as shown in FIG. 7(a), the first indication information carried in the downlink control information includes the K information segments (a block #1 to a block #K shown in FIG. 7(a)). Each information segment corresponds to one terminal device pair (as shown in FIG. 7(a), the block #1 corresponds to a terminal device pair #1, a block #2 corresponds to a terminal device pair #2, . . . , and the block #corresponds to a terminal device pair #K), and each information segment is used to determine a slot format corresponding to a terminal device in a terminal device pair corresponding to the information segment.

Figure 7B:
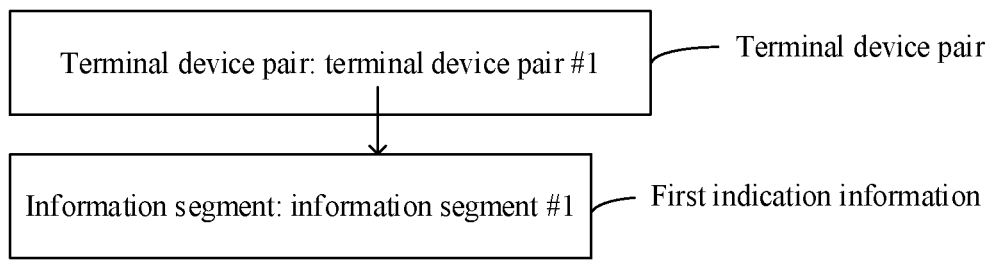

Case 2:

A pairing status of the terminal device pairs in the sidelink communications system in the coverage of the network device is shown in FIG. 3(a). The first indication information includes the K information segments. The K information segments are in the one-to-one correspondence with the K terminal device pairs. If K is equal to 1, as shown in FIG. 7(b), the first indication information carried in the downlink control information includes one information segment (a block #1 shown in FIG. 7(b)). The information segment corresponds to one terminal device pair (as shown in FIG. 7(b), the block #1 corresponds to a terminal device pair #1), and the information segment is used to determine a slot format corresponding to a terminal device in the terminal device pair corresponding to the information segment.

Figure 7C:
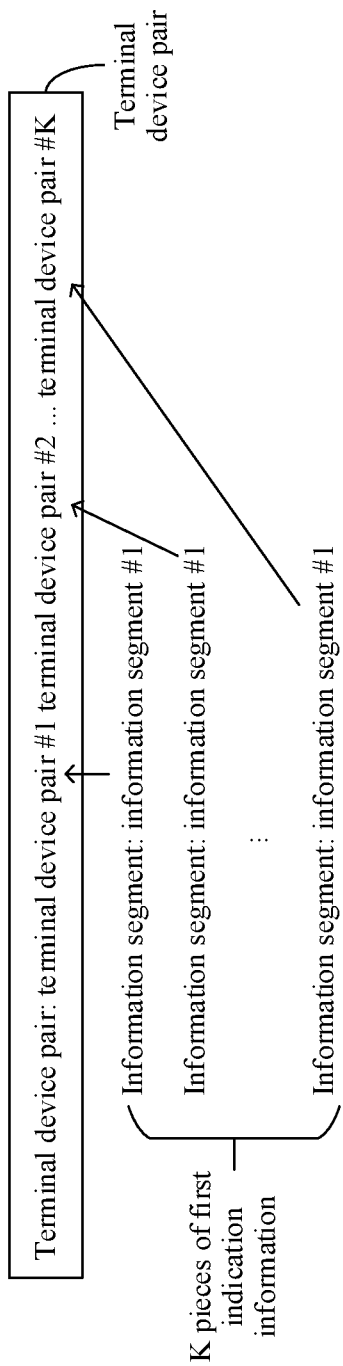

Specifically, in the case shown in Case 2, if the network device needs to configure a corresponding slot format for a terminal device in a plurality of terminal device pairs, the network device needs to add a plurality of pieces of first indication information into a plurality of pieces of downlink control information. Each piece of first indication information includes one information segment (each piece of first indication information in K pieces of first indication information shown in FIG. 7(c) includes a block #1, where K is an integer greater than 1), and each information segment is used to determine a slot format corresponding to a terminal device in a terminal device pair corresponding to the information segment. As shown in FIG. 7(c), each piece of downlink control information carrying the first indication information may be scrambled by using a terminal device pair-radio network temporary identifier (RNTI) of a terminal device pair corresponding to an information segment included in the first indication information. The terminal device pair-RNTI may also be referred to as a pair-RNTI.

It should be understood that, in Case 2, when the pairing status of the terminal device pair in the sidelink communications system in the coverage of the network device is that one terminal device simultaneously belongs to a plurality of different terminal device pairs as shown in FIG. 3(b) or FIG. 3(c), the terminal device needs to detect the plurality of pieces of first indication information corresponding to the plurality of terminal device pairs and learn of corresponding slot format indicator information from the information segments in the plurality of pieces of first indication information.

For example, as shown in FIG. 3(b), if the terminal device #B belongs to both the terminal device pair #1 and the terminal device pair #2, the terminal device #B needs to detect first indication information corresponding to the terminal device pair #1 and first indication information corresponding to the terminal device pair #2; and jointly determine, based on slot format indicator information corresponding to information segments in the two pieces of first indication information, a configuration status of the terminal device #B on each symbol. The configuration status includes a plurality of possible transmission statuses such as a transmission/reception/flexible symbol. In this case, the network device needs to send a plurality of pieces of downlink control information. This increases detection complexity of the terminal device, causing resource waste.

Figure 7D:
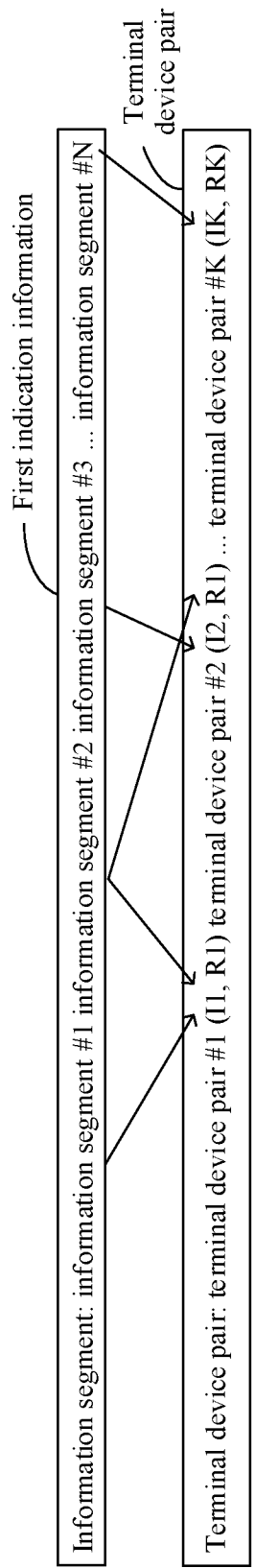

Case 3:

As shown in FIG. 3(b), the pairing status of the terminal device pair in the sidelink communications system in the coverage of the network device is that one terminal device simultaneously belongs to a plurality of terminal device pairs and serves as a receiving terminal device in the plurality of terminal device pairs. The first indication information includes N information segments. One information segment is used to indicate a slot format corresponding to one terminal device. The N information segments are in a one-to-one correspondence with N terminal devices. K is an integer greater than 1, and N is an integer greater than K. As shown in FIG. 7(d), in FIG. 7(d), "I" represents an initiating terminal device, "R" represents a receiving terminal device, and R2 belongs to both the terminal device pair #1 and the terminal device pair #2 and serves as a receiving terminal device in both the terminal device pair #1 and the terminal device pair #2.

The first indication information carried in the downlink control information includes N information segments (a block #1 to a block #N shown in FIG. 7(d)). Each information segment corresponds to one terminal device (as shown in FIG. 7(d), the block #1 corresponds to I1 in a terminal device pair #1, a block #2 corresponds to R1 in the terminal device pair #1 and a terminal device pair #2, a block #3 corresponds to I2 in the terminal device pair #2, . . . , and the block #N corresponds to IK in a terminal device pair #K). The N information segments in the first indication information need to include only slot format indicator information of I or R.

Figure 7E:
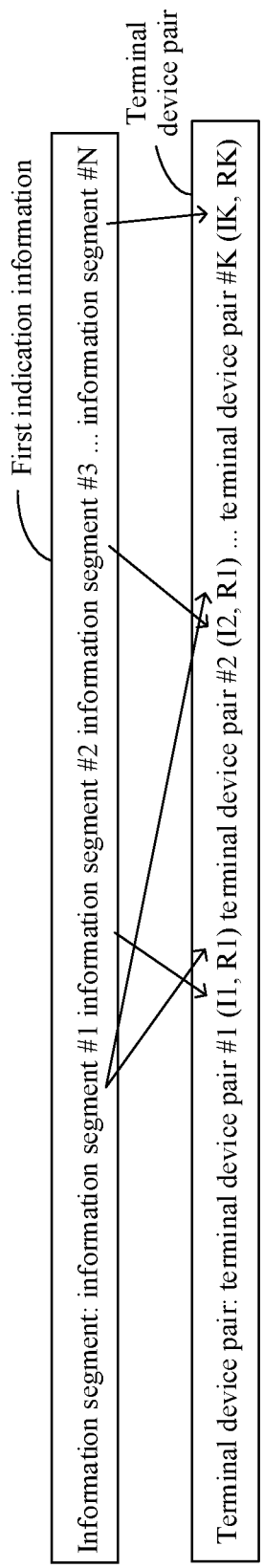

It should be understood that FIG. 7(d) is merely a possible form. Different correspondences may further exist between one terminal device and one information segment. For example, as shown in FIG. 7(e), a block #1 corresponds to R1 in a terminal device pair #1 and a terminal device pair #2, a block #2 corresponds to I1 in the terminal device pair #1, a block #3 corresponds to I2 in the terminal device pair #2, . . . , and a block #N corresponds to IK in a terminal device pair #K. This is not listed herein.

Figure 7F:
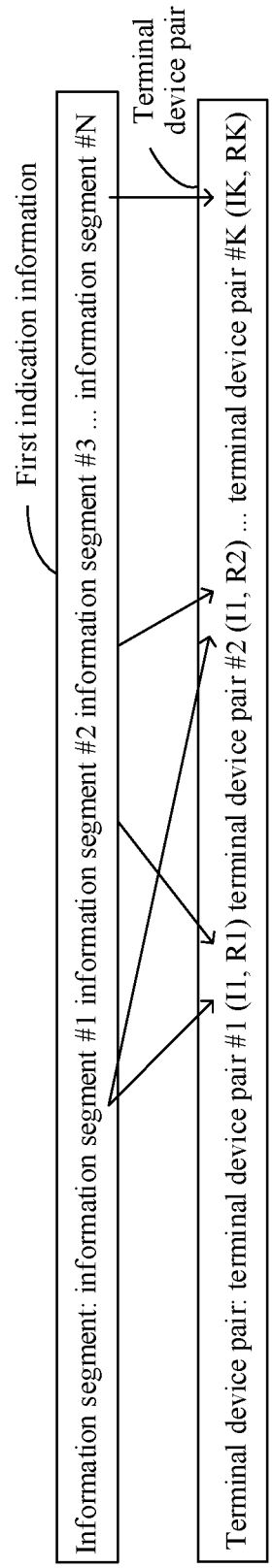

Case 4:

As shown in FIG. 3(c), the pairing status of the terminal device pair in the sidelink communications system in the coverage of the network device is that one terminal device belongs to a plurality of terminal device pairs and serves as an initiating terminal device in the plurality of terminal device pairs. The first indication information includes N information segments. One information segment is used to indicate a slot format corresponding to one terminal device. The N information segments are in a one-to-one correspondence with N terminal devices. K is an integer greater than 1, and N is an integer greater than K. As shown in FIG. 7(f), in FIG. 7(f), "I" represents an initiating terminal device, "R" represents a receiving terminal device, and I1 belongs to both the terminal device pair #1 and the terminal device pair #2 and serves as an initiating terminal device.

The first indication information carried in the downlink control information includes the N information segments (a block #1 to a block #N shown in FIG. 7(f)). Each information segment corresponds to one terminal device (as shown in FIG. 7(f), the block #1 corresponds to I1 in a terminal device pair #1 and a terminal device pair #2, a block #2 corresponds to R1 in the terminal device pair #1, a block #3 corresponds to R2 in the terminal device pair #2, . . . , and the block #N corresponds to IK in a terminal device pair #K). The N information segments in the first indication information need to include only slot format indicator information of I or R.

It should be understood that FIG. 7(f) is only a possible form. Different correspondences may further exist between one terminal device and one information segment. This is not listed herein.

In Case 3, one terminal device belongs to more than one terminal device pair, and serves as a receiving terminal device in the plurality of terminal device pairs. When the network device performs slot format configuration, the first indication information may include slot format indicators corresponding to a plurality of initiating terminal devices and a slot format indicator corresponding to one receiving terminal device. In addition, the network device establishes a correspondence between each block of the first indication information and each of the initiating terminal device and the receiving terminal device, so that the receiving terminal device derives, based on the slot format indicators corresponding to the plurality of initiating terminal devices and the slot format indicator of the receiving terminal device, the slot format indicator related to the receiving terminal device. The correspondence between each block of the first indication information and each of the initiating terminal device and the receiving terminal device may be preconfigured in the network device and/or the terminal device, or may be sent by the network device to the terminal device by using RRC signaling.

For example, as shown in FIG. 7(d) and FIG. 7(e), R2 may learn of slot format indicators of I1, I2, and R2. It is assumed that a slot format in the slot format indicator of I1 is "TTXXXXXR", a slot format in the slot format indicator of I2 is "XXTTTXRX", and a slot format in the slot format indicator of R2 is "RRRRRXTT". In this case, R2 may derive that information from I1 is received on a symbol 1 and a symbol 2, information from I2 is received on a symbol 3 to a symbol 5, a feedback to I2 is sent on a symbol 7, and a feedback to I1 is sent on a symbol 8.

Similarly, in Case 4, one terminal device belongs to more than one terminal device pair, and serves as an initiating terminal device in a plurality of terminal device pairs. When the network device performs slot format configuration, the first indication information may include slot format indicators corresponding to a plurality of receiving terminal devices and a slot format indicator corresponding to one initiating terminal device. In addition, the network device establishes a correspondence between each block of the first indication information and each of the initiating terminal device and the receiving terminal device, so that the initiating terminal device derives, based on the slot format indicators corresponding to the plurality of receiving terminal devices and the slot format indicator of the initiating terminal device, the slot format indicator related to the initiating terminal device. The correspondence between each block of the first indication information and each of the initiating terminal device and the receiving terminal device may be preconfigured in the network device and/or the terminal device, or may be sent by the network device to the terminal device by using RRC signaling.

For example, as shown in FIG. 7(f), I1 may learn of slot format indicator information of R1, R2, and I1. It is assumed that a slot format indicated by the slot format indicator information of R1 is "RRXXXXXT", a slot format indicated by the slot format indicator information of R2 is "XXRRRRTX", and a slot format indicated by the slot format indicator information of I1 is "TTTTTTRR". In this case, I2 may derive that information is sent to R1 on a symbol 1 and a symbol 2, information is sent to R2 on a symbol 3 to a symbol 6, a feedback from R2 is received on a symbol 7, and a feedback from R1 is received on a symbol 8.

In comparison with the solution shown in Case 2, in the solutions shown in Case 3 and Case 4, the terminal device simultaneously belonging to the plurality of terminal device pairs may learn of, through detecting the first indication information at a time, slot format configuration statuses of the plurality of terminal device pairs associated with the terminal device, thereby reducing detection complexity of the terminal device and a configuration resource of the network device.

Specifically, the downlink control information is the DCI described above, the first indication information is information used to indicate a slot format, and the DCI is used to carry the slot format indicator information.

For example, the DCI includes the following information:
(1) a DCI format identifier, where the DCI format identifier may occupy one or more bits;
(2) (an identifier of a start terminal device pair) that is an optional item; and
(3) SFI information of an initiating terminal device in a terminal device pair #1, SFI information of a receiving terminal device in the terminal device pair #1, . . . , SFI information of an initiating terminal device in a terminal device pair #K, and SFI information of a receiving terminal device in the terminal device pair #K.

For example, the identifier of the start terminal device pair in information included in the DCI is an optional item. When a size of the DCI is enough, the item does not need to be added. When a size of the DCI is not enough, this item needs to be added. The following provides a detailed description with reference to specific scenarios. Details are not described herein.

For example, if the SFI information of the receiving terminal device in the information included in the DCI may be derived from the SFI information of the initiating terminal device, one information segment may be used to indicate only a slot format corresponding to an initiating terminal device in one terminal device pair.

For example, the slot format corresponding to the receiving terminal device is opposite to the slot format corresponding to the initiating terminal device. In this case, the SFI information of the receiving terminal device in the terminal device pair #1 to the SFI information of the receiving terminal device in the terminal device pair #K may be omitted, that is, the DCI does not need to include the SFI information of the receiving terminal device.

Similarly, if the SFI information of the initiating terminal device in the information included in the DCI may be derived from the SFI information of the receiving terminal device, one information segment may be used to indicate a slot format corresponding to a receiving terminal device in one terminal device pair.

For example, the SFI information of the initiating terminal device in the terminal device pair #1 to the SFI information of the initiating terminal device in the terminal device pair #K may be omitted, that is, the DCI does not need to include the SFI information of the initiating terminal device. The following provides a detailed description with reference to specific scenarios. Details are not described herein again.

For example, the first indication information is slot format indicator information corresponding to the terminal devices in the K terminal device pairs, and sidelink communication is performed between the terminal devices in the terminal device pair. The first indication information may be referred to as sidelink communication slot format indicator (SL-SFI) information.

For example, in correspondence to Case 1, in order that the K information segments are in a one-to-one correspondence with the K terminal device pairs, the network device needs to determine the one-to-one correspondence between the K information segments and the K terminal device pairs.

Optionally, the network device sends a second message to the terminal devices in the K terminal device pairs. The second message includes the one-to-one correspondence between the K information segments and the K terminal device pairs. The second message may be semi-static signaling, or another message that is used for sending the one-to-one correspondence between the K information segments and the K terminal device pairs.

For example, the second message may be RRC signaling, MAC signaling, or physical layer signaling; or the second message may be any message that is determined by the network device and that is used to carry the one-to-one correspondence between the K information segments and the K terminal device pairs.

Alternatively, the one-to-one correspondence between the K information segments and the K terminal device pairs is preconfigured in the network device and/or the terminal devices in the K terminal device pairs.

The one-to-one correspondence between the information segment and the terminal device pair in this specification may also be referred to as a one-to-one correspondence between a terminal device pair and a location of information including SFI in the downlink control information.

Specifically, the one-to-one correspondence between the information segment and the terminal device pair may be a one-to-one correspondence between the information segment and an identifier of the terminal device pair. In other words, the terminal device can determine the information segment corresponding to the terminal device pair based on the identifier of the terminal device pair. The identifier of the terminal device pair may be an index of the terminal device pair or information that can be used to uniquely determine the terminal device pair in the sidelink communications system in the coverage of the network device.

Specifically, the terminal device can determine the information segment corresponding to the terminal device pair based on the identifier of the terminal device pair in the following manners:

Manner 1:

Each information segment in the first indication information includes an identifier of one terminal device pair. Each information segment includes SFI information of a terminal device in the terminal device pair indicated by the identifier of the terminal device pair.

Figure 8:
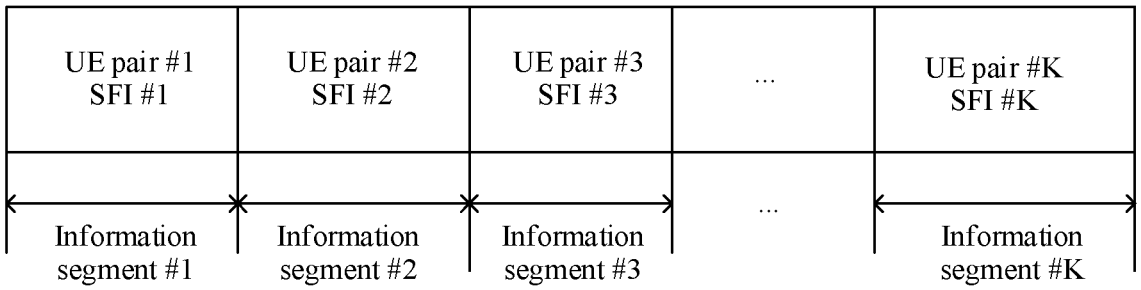
FIG. 8 is a schematic diagram of a one-to-one correspondence between an information segment and a terminal device pair according to an embodiment of this application.

FIG. 8 is a schematic diagram of a one-to-one correspondence between an information segment and a terminal device pair according to an embodiment of this application. The schematic diagram includes a block #1 to a block #K. Each block includes an identifier of a terminal device pair (UE pair #1 to UE pair #K shown in FIG. 8) and the SFI information corresponding to the terminal device pair (SFI #1 to SFI #K shown in FIG. 8). In other words, it may be indicated that each block includes SFI information of a terminal device in a specific terminal device pair.

Figure 9:
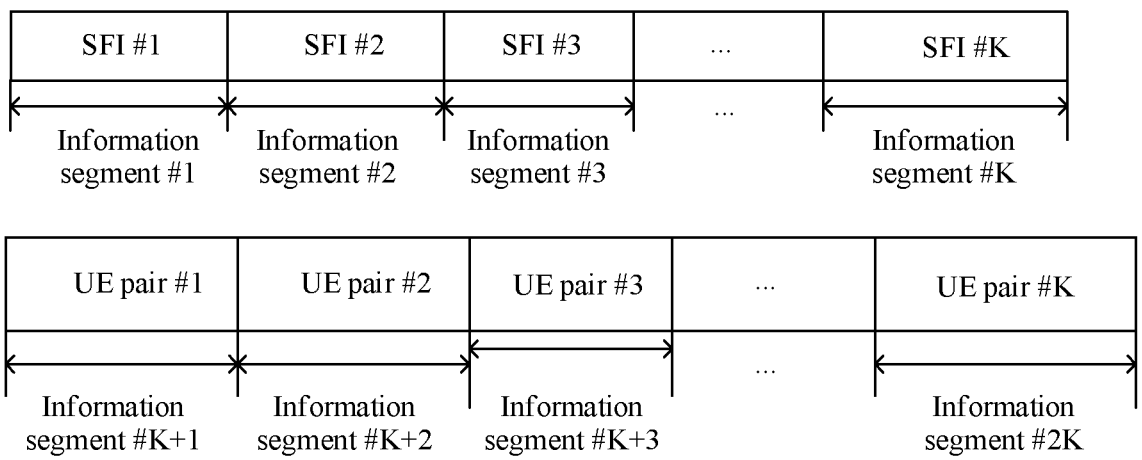
FIG. 9 is a schematic diagram of another one-to-one correspondence between an information segment and a terminal device pair according to an embodiment of this application.

Specifically, FIG. 9 is a schematic diagram of another one-to-one correspondence between an information segment and a terminal device pair according to an embodiment of this application. The schematic diagram includes a block #1 to a block #K, where each block includes SFI information (SFI #1 to SFI #K shown in FIG. 9) corresponding to a terminal device pair; and a block #K+1 to a block #2K, where each block includes identifiers of terminal device pairs corresponding to the block #1 to the block #K. In other words, a correspondence between the identifier of the terminal device pair and the information segment including the SFI information of the terminal device pair may be established. In FIG. 9, a sequence of the block #1 to the block #K and a sequence of the block #K+1 to the block #2K may be switched. In FIG. 9, the block #1 to the block #K may also be referred to as a sub block #1 to a sub block #K in one block, and the block #K+1 to the block #2K may also be referred to as a sub block #K+1 to a sub block #2K in one block.

Manner 2:

To preset a sequence of the identifier of the terminal device pair corresponding to each information segment in the first indication information, each information segment needs to include only the SFI corresponding to the terminal device pair, and does not need to carry the identifier of the terminal device pair shown in FIG. 8 and FIG. 9.

For example, it is preset that an ascending order starts from the identifier 1 of a terminal device pair. In this case, a terminal device correspondingly obtains an information segment based on an identifier of a terminal device pair to which the terminal device belongs. When a terminal device #1 belongs to a terminal device pair whose identifier is 1, the terminal device #1 obtains a block #1, and obtains SFI information of the terminal device #1 from the block #1. The identifier of 1 of the terminal device pair may not need to be carried in the downlink control information. The preset ascending order may be notified to the terminal devices in the K terminal device pairs by using semi-static signaling, or may be preconfigured in the network device and/or the terminal devices in the K terminal device pairs.

For another example, it is preset that a descending order starts from the identifier K of a terminal device pair. In this case, a terminal device correspondingly obtains a block based on an identifier of a terminal device pair to which the terminal device belongs. When a terminal device #1 belongs to a terminal device pair whose identifier is 1, the terminal device #1 obtains a block #K, and obtains SFI information of the terminal device #1 from the block #K. The identifier of K of the terminal device pair may not need to be carried in the downlink control information. The preset descending order may be notified to the terminal devices in the K terminal device pairs by using semi-static signaling, or may be preconfigured in the network device and/or the terminal devices in the K terminal device pairs.

For another example, it is preset that an ascending order starts from the identifier P of a terminal device pair. In this case, a terminal device correspondingly obtains a block based on an identifier of a terminal device pair to which the terminal device belongs. When a terminal device #1 belongs to a terminal device pair whose identifier is P, the terminal device #1 obtains a block #1, and obtains SFI information of the terminal device #1 from the block #1. The identifier of P of the terminal device pair and the ascending order may be notified to the terminal devices in the K terminal device pairs by using semi-static signaling, or may be preconfigured in the network device and/or the terminal devices in the K terminal device pairs.

For another example, it is preset that a descending order starts from the identifier P of a terminal device pair. In this case, a terminal device correspondingly obtains a block based on an identifier of a terminal device pair to which the terminal device belongs. When a terminal device #1 belongs to a terminal device pair whose identifier is 1, the terminal device #1 obtains a block #P, and obtains SFI information of the terminal device #1 from the block #P. The identifier of P of the terminal device pair and the descending order may be notified to the terminal devices in the K terminal device pairs by using semi-static signaling, or may be preconfigured in the network device and/or the terminal devices in the K terminal device pairs.

For another example, a sequence of an identifier of a terminal device pair corresponding to each information segment in the first indication information may be in a predefined order, or may be in a discontinuous ascending order, or may be in a discontinuous descending order. These may be used as examples and are not listed herein.

Manner 3:

The network device determines the one-to-one correspondence between the identifiers of the K terminal device pairs and the K information segments, and notifies the terminal device in the terminal device pair of the one-to-one correspondence by using the second message. The second message may be semi-static signaling. Alternatively, the one-to-one correspondence between the K information segments and the identifiers of the K terminal device pairs is preconfigured in the network device and/or the terminal devices in the K terminal device pairs. In this case, the terminal device can obtain, based on the one-to-one correspondence between the identifier of the terminal device pair and the information segment, the information segment corresponding to the identifier of the terminal device pair.

For example, in Case 2, because each piece of first indication information includes only one information segment, the one-to-one correspondence between the information segment and the terminal device pair does not need to be established in advance.

Specifically, in Case 2, the information segment corresponding to the terminal device pair can be determined based on the identifier of the terminal device pair in the following manners:

Manner 1:

As shown in FIG. 8, the identifier of the corresponding terminal device pair is added to the information segment, and the corresponding information segment can be obtained based on the identifier of the terminal device pair. A variation to FIG. 8 may be that there is only one information segment.

Manner 2:

Different first indication information is separately scrambled in different manners.

For example, downlink control information #1 carries first indication information #1, where a block #1 included in the first indication information #1 corresponds to a terminal device pair #1; and downlink control information #1 carries first indication information #2, where a block #2 included in the first indication information #2 corresponds to a terminal device pair #2. In this case, an identifier #1 and an identifier #2 are respectively defined for the terminal device pair #1 and the terminal device pair #2. The downlink control information #1 is scrambled by using the identifier #1, and the downlink control information #2 is scrambled by using the identifier #2. Therefore, a terminal device in the terminal device pair #1 demodulates only the downlink control information #1, and a terminal device in the terminal device pair #2 demodulates only the downlink control information #2.

Specifically, different identifiers for scrambling may be defined for different terminal device pairs. The identifier for scrambling may be defined by the network device, and notified to the terminal device by using semi-static signaling; or may be preconfigured in the network device and the terminal device in the system. Alternatively, to avoid introduction of more identifiers, scrambling may be performed by using a cell radio network temporary identifier (C-RNTI) of any terminal device in the terminal device pair. That the identifier for scrambling may be defined by the network device and notified to the terminal device by using the semi-static signaling includes: The network device defines a terminal device pair-radio network temporary identifier (pair-RNTI) for each terminal device pair, and notifies the terminal device of the identifier by using RRC signaling. The terminal device includes at least an initiating device and a receiving device in the terminal device pair. That the identifier for scrambling may be preconfigured in the network device and the terminal device in the system includes: The system (for example, operation administration and management (OAM)) defines a pair-RNTI for each terminal device pair, and notifies the terminal device of the pair-RNTI by using RRC signaling. The terminal device includes at least an initiating device and a receiving device in the terminal device pair.

The pair-RNTI in this specification may indicate a pair-RNTI for a sidelink.

For example, in correspondence to Case 3 and Case 4, in order that the N information segments are in the one-to-one correspondence to the N terminal devices, the one-to-one correspondence between the N information segments and the N terminal devices is determined. Specifically, the one-to-one correspondence between the N information segments and the identifiers of the N terminal devices may be determined. In other words, the information segment corresponding to the terminal device can be determined based on the identifier of the terminal device. The identifier of the terminal device may be information that can be used to uniquely determine the terminal device in the sidelink communications system in the coverage of the network device.

Specifically, the information segment corresponding to the terminal device can be determined based on the identifier of the terminal device in the following manners:

Manner 1:

Each information segment in the first indication information includes an identifier of one terminal device. Each information segment includes SFI information of the terminal device in the terminal device indicated by the identifier of the terminal device.

Figure 10:
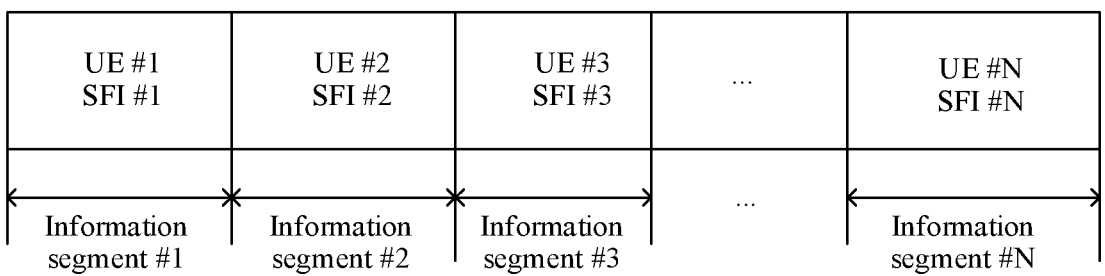
FIG. 10 is a schematic diagram of a one-to-one correspondence between an information segment and a terminal device according to an embodiment of this application.

FIG. 10 is a schematic diagram of a one-to-one correspondence between an information segment and a terminal device according to an embodiment of this application. The schematic diagram includes a block #1 to a block #N. Each block includes an identifier of a terminal device (UE #1 to UE #N shown in FIG. 10) and SFI information (an SFI #1 to an SFI #N shown in FIG. 10) corresponding to the terminal device. In other words, it may be indicated that each information segment includes SFI information of a specific terminal device.

Figure 11:
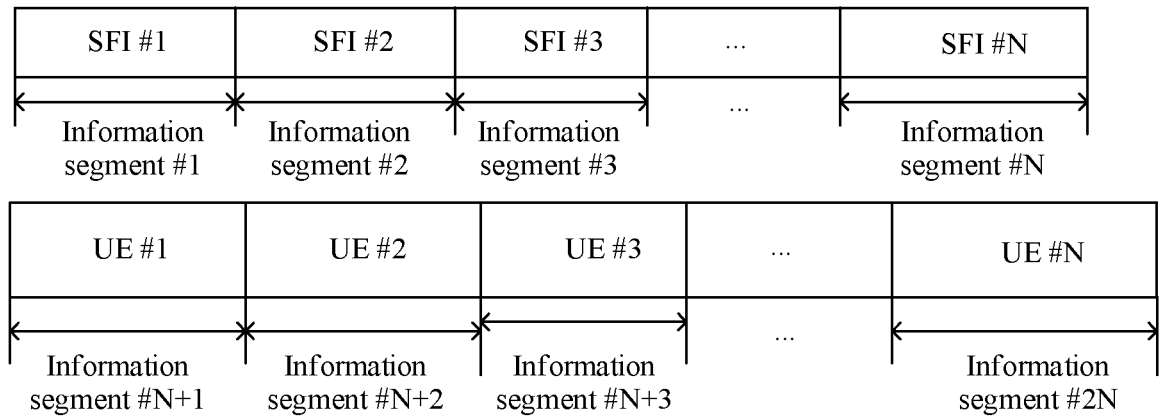
FIG. 11 is a schematic diagram of another one-to-one correspondence between an information segment and a terminal device according to an embodiment of this application.

Specifically, FIG. 11 is a schematic diagram of another one-to-one correspondence between an information segment and a terminal device according to an embodiment of this application. The schematic diagram includes a block #1 to a block #N, where each block includes SFI information (an SFI #1 to an SFI #N shown in FIG. 11) corresponding to a terminal device; and a block #N+1 to a block #2N, where each block includes identifiers of terminal devices corresponding to the block #1 to the block #N. In other words, a correspondence between the identifier of the terminal device and the block including the SFI information of the terminal device may be established. In FIG. 11, a sequence of the block #1 to the block #N and a sequence of the block #N+1 to the block #2N may be switched. In FIG. 11, the block #1 to the block #N may also be referred to as a sub block #1 to a sub block #N in one block, and the block #N+1 to the block #2N may also be referred to as a sub block #N+1 to a sub block #2N in one block.

Manner 2:

To preset a sequence of the identifier of the terminal device corresponding to each information segment in the first indication information, each information segment needs to include only the SFI corresponding to the terminal device, and does not need to carry the identifier of the terminal device shown in FIG. 10 and FIG. 11.

For example, it is preset that an ascending order starts from the identifier 1 of a terminal device. In this case, a terminal device correspondingly obtains a block based on an identifier of the terminal device. When an identifier of a terminal device #1 is 1, the terminal device #1 obtains a block #1, and obtains SFI information of the terminal device #1 from the block #1. The identifier of 1 of the terminal device may be default.

For another example, it is preset that a descending order starts from the identifier N of a terminal device. In this case, a terminal device correspondingly obtains a block based on an identifier of the terminal device. When an identifier of a terminal device #1 is 1, the terminal device #1 obtains a block #N, and obtains SFI information of the terminal device #1 from the block #N. The identifier of N of the terminal device may be default.

For another example, it is preset that an ascending order starts from the identifier P of a terminal device. In this case, a terminal device correspondingly obtains a block based on an identifier of the terminal device. When an identifier of a terminal device #1 is P, the terminal device #1 obtains a block #1, and obtains an SFI of the terminal device #1 from the block #1. The identifier of P of the terminal device is notified to the terminal device by using semi-static signaling, or preconfigured in the network device and/or the terminal devices in the N terminal device.

For another example, it is preset that a descending order starts from the identifier P of a terminal device. In this case, the terminal device correspondingly obtains a block based on an identifier of the terminal device. When an identifier of a terminal device #1 is 1, the terminal device #1 obtains a block #P, and obtains an SFI of the terminal device #1 from the block #P. The identifier of P of the terminal device is notified to the terminal device by using semi-static signaling, or preconfigured in the network device and/or the terminal devices in the N terminal device pairs.

For another example, a sequence of an identifier of a terminal device corresponding to each information segment in the first indication information may be in a predefined order, or may be in a discontinuous ascending order, or may be in a discontinuous descending order. These may be used as examples and are not listed herein.

Manner 3:

The one-to-one correspondence between the identifiers of the N terminal devices and the N information segments is preconfigured, and the one-to-one correspondence is notified to the terminal device in the terminal device pair by using a third message. The third message may be semi-static signaling to be notified to the terminal device. Alternatively, the one-to-one correspondence between the N information segments and the identifiers of the N terminal devices is preconfigured in the network device and/or the terminal devices in the N terminal device pairs. In this case, the terminal device obtains, based on the one-to-one correspondence between the identifier of the terminal device and the information segment, the information segment corresponding to the identifier of the terminal device.

In this embodiment of this application, the network device may perform signaling interworking with a terminal device in at least one terminal device pair, to facilitate slot format configuration. Generally, the sidelink communication method provided in this embodiment of this application is described in detail below by using signaling interworking between the network device and a network device in a first terminal device pair as an example.

It should be understood that the first terminal device pair may be any one of the at least one terminal device pair. "First" is merely used for differentiation and description, and should not constitute any limitation on this application.

The following is described by using an example in which the network device sends the downlink control information to the terminal device in the first terminal device pair. The first terminal device pair is any one of the foregoing K terminal device pairs. The first terminal device pair corresponds to a first information segment.

S120. The network device sends the downlink control information to the first terminal device pair. Correspondingly, the terminal device in the first terminal device pair receives the downlink control information.

For example, in Case 1, the first information segment includes slot format indicator (SFI) information corresponding to an initiating terminal device and/or a receiving terminal device in the first terminal device pair. The initiating terminal device and the receiving terminal device are two terminal devices in the first terminal device pair. The first terminal device pair is any one of the K terminal device pairs. The first information segment is an information segment in a one-to-one correspondence with an identifier of the first terminal device pair in the K information segments. The first information segment includes a first part and/or a second part. The first part includes SFI information of the initiating terminal device, and the second part includes SFI information of the receiving terminal device.

For example, FIG. 12 is a schematic diagram in which an information segment includes SFI information of a terminal device according to this application. The schematic diagram includes a first row and a second row. Specifically, the first row indicates a first block in the first indication information, and the second row indicates a first terminal device pair corresponding to the first block.

Figure 12A:
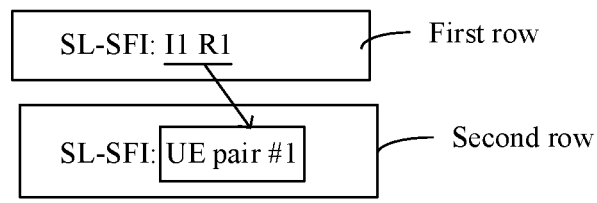
FIG. 12(a) to FIG. 12(c) are schematic diagrams in which an information segment includes SFI information of a terminal device according to this application.

As shown in FIG. 12(a), the first row includes I1 (an initiating terminal device) and R1 (a receiving terminal device), and the second row includes UE pair #1 (the first terminal device pair). It may be learned from FIG. 12(a) that, that the first information segment includes the SFI information of the initiating terminal device and the receiving terminal device in the first terminal device pair includes that the first part of the first information segment includes the SFI information of the initiating terminal device, and the second part of the first information segment includes the SFI information of the receiving terminal device.

Figure 12B:
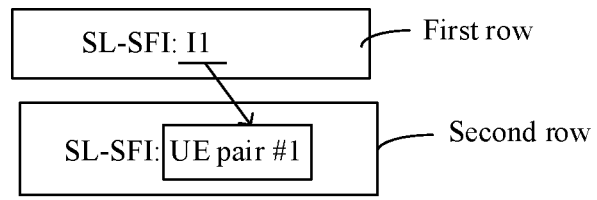

As shown in FIG. 12(b), the first row includes I1 (an initiating terminal device), and the second row includes UE pair #1 (the first terminal device pair). It may be learned from FIG. 12(b) that the first information segment includes the SFI information of the initiating terminal device in the first terminal device pair. A slot format corresponding to the receiving terminal device in the first terminal device pair may be opposite to a slot format corresponding to the initiating terminal device in the first terminal device pair. Therefore, the first information segment does not need to include the SFI information of the receiving terminal device in the first terminal device pair.

Figure 12C:
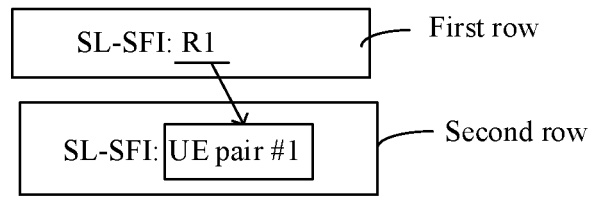

Similarly, as shown in FIG. 12(c), the first row includes R1 (a receiving terminal device), and the second row includes UE pair #1 (the first terminal device pair). It may be learned from FIG. 12(c) that the first information segment includes the SFI information of the receiving terminal device in the first terminal device pair. A slot format corresponding to the initiating terminal device in the first terminal device pair may be opposite to a slot format corresponding to the receiving terminal device in the first terminal device pair. Therefore, the first block does not need to include the SFI information of the initiating terminal device in the first terminal device pair.

Figure 13:
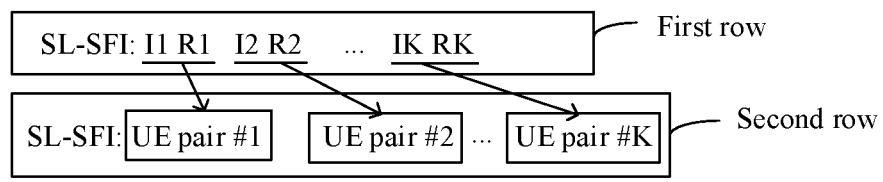
FIG. 13 is another schematic diagram in which an information segment includes SFI information of a terminal device according to this application.

It should be understood that the first terminal device pair is used as an example for description in FIG. 12. The first indication information includes K information segments. FIG. 13 is another schematic diagram in which an information segment includes SFI information of a terminal device according to this application. The embodiment in FIG. 13 is similar to that in FIG. 12. Details are not described herein again.

For example, the SFI information included in each information segment may be a table that is preconfigured by using RRC signaling and that is used to determine an SFI. The table includes a correspondence between a SFI index and an actual transmission status (a transmit state, a receive state, or an unknown state) of a symbol. Therefore, the SFI information included in the information segment is each SFI index. The table used to determine the SFI is a slot format combination table specific to the terminal device configured for a sidelink.

For example, the SFI information included in each information segment may further be a bitmap with a preset length. The preset length may be notified by the network device to the terminal device in the terminal device pair by using RRC signaling. Alternatively, the preset length may be preset in the network device and the terminal device. The bitmap with the preset length indicates an indication of determining an actual transmission status (a transmit state, a receive state, or an unknown state) of a symbol within a specific time range starting from a first moment. Therefore, the SFI information included in the information segment is an SFI bitmap.

For example, before sending the downlink control information, the network device scrambles the downlink control information. Specifically, the network device defines a first identifier, and scrambles the downlink control information by using the first identifier.

For example, for Case 1, the first identifier is predefined by the network device. The network device notifies the terminal devices in the K terminal device pairs of the first identifier by using semi-static signaling, so that all the terminal devices in the K terminal device pairs can learn of the first identifier in advance. Alternatively, the first identifier is preconfigured. Pre-configuration refers to presetting the first identifier in the network device and/or the terminal device.

For example, for Case 2, the first identifier is predefined by the network device. The network device notifies the terminal devices in the K terminal device pairs by using semi-static signaling, so that all the terminal devices in the K terminal device pairs can learn of the first identifier in advance. Alternatively, the first identifier is a C-RNTI of any terminal device in the terminal device pair. Alternatively, the first identifier is a pair-RNTI specifically defined for the terminal device.

For example, for Case 3, the first identifier is predefined by the network device. The network device notifies the terminal devices in the K terminal device pairs of the first identifier by using semi-static signaling, so that all the terminal devices in the K terminal device pairs can learn of the first identifier in advance. Alternatively, the first identifier is a C-RNTI of a receiving terminal device simultaneously belonging to a plurality of terminal device pairs.

For example, for Case 4, the first identifier is predefined by the network device. The network device notifies the terminal devices in the K terminal device pairs of the first identifier by using semi-static signaling, so that all the terminal devices in the K terminal device pairs can learn of the first identifier in advance. Alternatively, the first identifier is a C-RNTI of an initiating terminal device simultaneously belonging to a plurality of terminal device pairs.

Further, to simplify searching for the SFI information by the terminal device, the network device defines first search space of an SL, and sends third indication information to the terminal devices in the K terminal devices. The third indication information is used to indicate the first search space. The third indication information may be semi-static signaling. A control resource set (CORSET) may be further configured, to detect an SFI specific to the SL. For example, fourth indication information is sent to the terminal devices in the K terminal device pairs. The fourth indication information is used to indicate the CORSET. A control channel element (CCE) in one CORSET or in different CORSETs may also be configured, to detect SFIs of different terminal device pairs.

For example, due to a load limitation on the downlink control information, SFI information of terminal devices in the M terminal device pairs in the system cannot all be carried in the downlink control information. The downlink control information further includes second indication information. The second indication information is used to identify the K terminal device pairs. In other words, the downlink control information includes second indication information that can be used to determine K specific terminal device pairs whose terminal devices require slot format configuration.

For example, the second indication information may be an identifier of each of the K terminal device pairs shown in FIG. 8 and FIG. 9.

For example, the second indication information may indicate, by using a location offset or a time offset, the identifiers of the K terminal device pairs that can be indicated by using the first indication information. The location offset indicates an offset of a frequency domain location at which control information is sent in the first search space, and the time offset indicates an offset of a time at which control information is sent in the first search space.

For example, when there are 30 terminal device pairs (a terminal device pair #1 to a terminal device pair #30), SFI information of the terminal device pair #1 to a terminal device pair #5 is carried in downlink control information #1, SFI information of a terminal device pair #6 to a terminal device pair #10 is carried in downlink control information #2, . . . , and SFI information of a terminal device pair #25 to the terminal device pair #30 is carried in downlink control information #6.

Optionally, the downlink control information #1 may be located at a configured first control information location, the downlink control information #2 may be located at a configured second control information location, . . . , and the downlink control information #6 may be located at a configured sixth control information location.

Optionally, the first control information location is indicated by a first offset relative to a reference frequency domain resource, the second control information location is indicated by a second offset relative to the reference frequency domain resource, . . . , and the sixth control information location is indicated by a sixth offset relative to the reference frequency domain resource.

Optionally, the first control information location is indicated, the second control information location is indicated by a second offset relative to the first control information location, . . . , and the sixth control information location is indicated by a sixth offset relative to the first control information location. The indication is sent by the network device to the terminal device by using signaling, or preconfigured in the network device and/or the terminal device. Optionally, the downlink control information #1 may be located at a configured first control information time domain location, the downlink control information #2 may be located at a configured second control information time domain location, . . . , and the downlink control information #6 may be located at a configured sixth control information time domain location. Optionally, the first control information time domain location is indicated by a first offset relative to a reference time domain resource, the second control information location is indicated by a second offset relative to the reference time domain resource, . . . , and the sixth control information location is indicated by a sixth offset relative to the reference time domain resource. Alternatively, optionally, the first control information time domain location is indicated, the second control information time domain location is indicated by a second offset relative to the first control information time domain location, . . . , and the sixth control information time domain location is indicated by a sixth offset relative to the first control information time domain location. The indication is sent by the network device to the terminal device by using signaling, or preconfigured in the network device and/or the terminal device.

Certainly, a series of indications of the terminal device pair may also be jointly performed with reference to the location offset and the time offset. The method is similar and is not listed in detail.

For another example, when there are 30 terminal device pairs (a terminal device pair #1 to a terminal device pair #30) in total, SFI information of the terminal device pair #1 to a terminal device pair #5 is carried in downlink control information #1, SFI information of a terminal device pair #6 to a terminal device pair #10 is carried in downlink control information #2, . . . , and SFI information of a terminal device pair #25 to the terminal device pair #30 is carried in downlink control information #6.

When the terminal device pair #1 to the terminal device pair #5 share the downlink control information #1, these terminal device pairs may be differentiated by using the location offset or the time offset (timing offset). Based on a reference frequency domain resource, a location offset of the terminal device pair #1 is 0, a location offset of the terminal device pair #2 is 1, . . . , and a location offset of the terminal device pair #5 is 4. Therefore, the terminal device detects the SFI information based on the foregoing different location offsets, and the terminal device learns of a specific terminal device pair whose corresponding SFI information is the SFI information.

Similarly, the time offset (or referred to as a time domain offset) may be alternatively defined. Based on a reference time domain resource, a time domain offset of the terminal device pair #1 is 0, a time domain offset of the terminal device pair #2 is 1, . . . , and a time domain offset of the terminal device pair #5 is 4. Therefore, the terminal device detects the SFI information based on the foregoing different time offsets, and the terminal device learns of a specific terminal device pair whose corresponding SFI information is the SFI information.

Certainly, an indication of the terminal device pair may also be jointly performed with reference to the location offset and the time offset. The method is similar and is not described in detail.

For example, the second indication information includes an identifier of a start terminal device pair in the K terminal device pairs. In other words, the second indication information is an additional domain added into the downlink control information to indicate the K terminal device pairs. The field is used to indicate the identifier of the start terminal device pair in the K terminal device pairs that can be indicated by the downlink control information. In other words, the first indication information carried in the downlink control information can indicate slot formats of a series of terminal device pairs or terminal device pairs in a range starting from the identifier of the start terminal device pair indicated by the field.

It should be understood that the network device and the terminal device both know identifiers of a plurality of unicast pairs in the sidelink communications system in the coverage of the network device and a sequence sorted based on the values of the identifiers of the unicast pairs. Therefore, only the identifier of the start terminal device pair in the K terminal device pairs may be indicated, and the K terminal device pairs are determined based on the known sequence and the identifier of the start terminal device pair.

Figure 14:
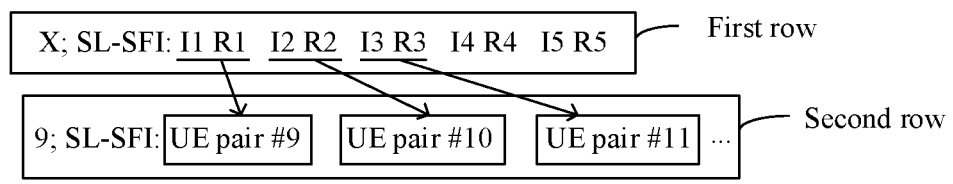
FIG. 14 is a schematic diagram of a format of second indication information according to this application.

FIG. 14 is a schematic diagram of a format of second indication information according to this application. A bit X may be added into the downlink control information. For example, when X=9, it indicates that the slot format configuration starts from a ninth terminal device pair in the first indication information included in the downlink control information. Therefore, a first information segment in the first indication information includes an SFI of the ninth terminal device pair, a second block includes SFI information of a tenth terminal device pair, and so on.

S130. The terminal device obtains the SFI information.

The network device sends the downlink control information to the terminal devices in different terminal device pairs, and scrambles the downlink control information by using the first identifier.

For example, for Case 1, description is provided by using an example in which the initiating terminal device in the first terminal device pair obtains the corresponding SFI information.

For example, the first information segment includes the SFI information of the initiating terminal device in the first terminal device pair. The initiating terminal device obtains, based on a one-to-one correspondence between the first terminal device pair and the first information segment, the first information segment corresponding to the first terminal device pair. Further, the initiating terminal device obtains the SFI information included in the first part that is of the first information segment and that corresponds to the initiating terminal device.

It should be understood that SFI information included in different information segments may indicate different slot formats.

For example, an identifier of a $K^{th}$ terminal device pair is k1, and a terminal device in the $K^{th}$ terminal device pair determines a corresponding information segment based on the identifier k1 to obtain SFI information of the $K^{th}$ terminal device pair.

Further, SFI information of adjacent terminal devices may be different, and SFI information of relatively distant terminal device pairs may be the same. Relatively distant terminal device pairs may be differentiated by the network device based on the signal strength of a signal such as reference signal received power (RSRP)/reference signal received quality (RSRQ) reported by a terminal device. The network device performs SFI information configuration.

Specifically, the semi-static signaling or the preconfigured configuration information in the foregoing may be at least one of RRC signaling, MAC signaling, or physical layer signaling.

Scrambling the downlink control information in this specification is scrambling a cyclic redundancy check (CRC) part in a first message.

In this application, to reduce detection costs, several different DCI sizes (payload size) may be predefined.

For example, in consideration of sizes of two terminal device pairs, a DCI size may be defined as 15 bytes; in consideration of sizes of three terminal device pairs, a DCI size may be defined as 20 bytes; in consideration of sizes of five terminal device pairs, a DCI size may be defined as 40 bytes; in consideration of sizes of eight terminal device pairs, a DCI size may be defined as 70 bytes; and in consideration of sizes of 10 terminal device pairs, a DCI size may be defined as 90 bytes. This is not listed herein. When corresponding DCI sizes are defined in consideration of several possible quantities of terminal device pairs, blind detection overheads (overhead) may be reduced.

The foregoing describes in detail the sidelink communication method provided in this application with reference to FIG. 6 to FIG. 14. With reference to a specific embodiment, the following briefly describes a use procedure of the sidelink communication method provided in this application in different sidelink unicast scenarios.

Figure 15:
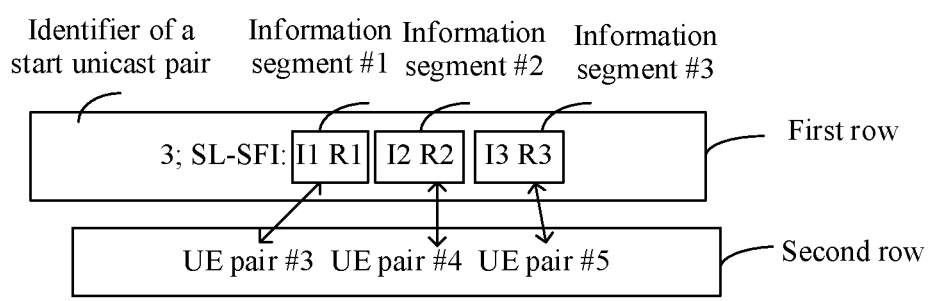
FIG. 15 is a schematic diagram of a slot format according to this application.

FIG. 15 is a schematic diagram of a slot format according to this application. The schematic diagram includes a first row and a second row. The first row is DCI, and the second row is different terminal device pairs.

It is assumed that there are five terminal device pairs in total in the sidelink communications system in the coverage of the network device, and identifiers of the five terminal device pairs are respectively UE pair #1 to UE pair #5. However, due to a limitation on the DCI size, SFIs corresponding to terminal devices in only three terminal device pairs in the system can be indicated. In other words, joint slot format indicator information (SL-SFI) of a plurality of terminal device pairs that is carried in the DCI includes only three blocks: respectively, a block #1 to a block #3. The three information segments are in a one-to-one correspondence with the three terminal device pairs.

First, the network device defines an RNTI for scrambling the DCI, and the RNTI is notified to the terminal device by using semi-static signaling. In this case, when receiving the DCI, the terminal device can parse the DCI based on the RNTI.

Second, the network device determines a one-to-one correspondence between the three information segments and the three terminal device pairs, and notifies the terminal device of the one-to-one correspondence by using semi-static signaling. When receiving the DCI, the terminal device can obtain the corresponding information segment based on the one-to-one correspondence and the identifier of the terminal device pair to which the terminal device belongs.

Finally, when each information segment includes SFI information of two terminal devices in a terminal device pair, a terminal device that is in the terminal device pair and that corresponds to each part in the information segment is determined. After obtaining the information segment corresponding to the terminal device pair to which the terminal device belongs, the terminal device further obtains the SFI information of the terminal device based on a correspondence between the terminal device and the part of the information segment.

As shown in FIG. 15, the DCI includes the following information:

(1) a DCI format identifier, where the DCI format identifier may occupy one or more bits;

(2) an identifier of a start terminal device pair: an identifier: UE pair #3 of a third terminal device pair in the system; and (3) a block #1 (SFI information of an initiating terminal device in a terminal device pair #3, and SFI information of a receiving terminal device in the terminal device pair #3), a block #2 (SFI information of an initiating terminal device in a terminal device pair #4, and SFI information of a receiving terminal device in the terminal device pair #4), and a block #3 (SFI information of an initiating terminal device in a terminal device pair #5, and SFI information of a receiving terminal device in the terminal device pair #5).

It should be understood that FIG. 15 shows only an example. When slot formats corresponding to two terminal devices in a terminal device pair may be derived from each other, each information segment in the DCI may include only SFI information of one terminal device in the terminal device pair.

Figure 16:
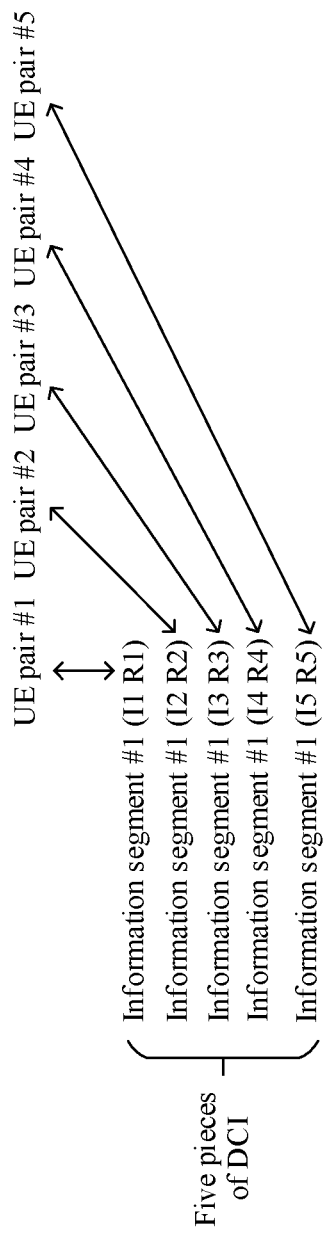
FIG. 16 is a schematic diagram of another slot format according to this application.

FIG. 16 is a schematic diagram of another slot format according to this application. The schematic diagram includes a left side and an upper side. The left side shows different DCIs, and the upper side shows different terminal device pairs.

It is assumed that there are five terminal device pairs in total in the sidelink communications system in the coverage of the network device, and identifiers of the five terminal device pairs are respectively UE pair #1 to UE pair #5. Each DCI includes only one information segment to indicate the SFI information of a terminal device in one terminal device pair.

First, the network device separately scrambles, by using a C-RNTI of one of the five terminal device pairs, five pieces of DCI respectively corresponding to the five terminal device pairs. In this case, when receiving the DCI, the terminal device can parse the DCI based on the C-RNTI.

Then, when each information segment includes the SFI information of two terminal devices in a terminal device pair, a terminal device that is in the terminal device pair and that corresponds to each part in the information segment is determined. After obtaining the information segment, the terminal device further obtains the SFI information of the terminal device based on a correspondence between the terminal device and the part of the information segment.

As shown in FIG. 16, each DCI includes the following information:
(1) a DCI format identifier, where the DCI format identifier may occupy one or more bits; and
(2) a block #X (SFI information of an initiating terminal device in a terminal device pair #X, and SFI information of a receiving terminal device in the terminal device pair #X), where X=1-5.

It should be understood that FIG. 16 shows merely an example. When slot formats corresponding to two terminal devices in a terminal device pair may be derived from each other, an information segment in the DCI may include only SFI information of one terminal device in the terminal device pair.

Figure 17:
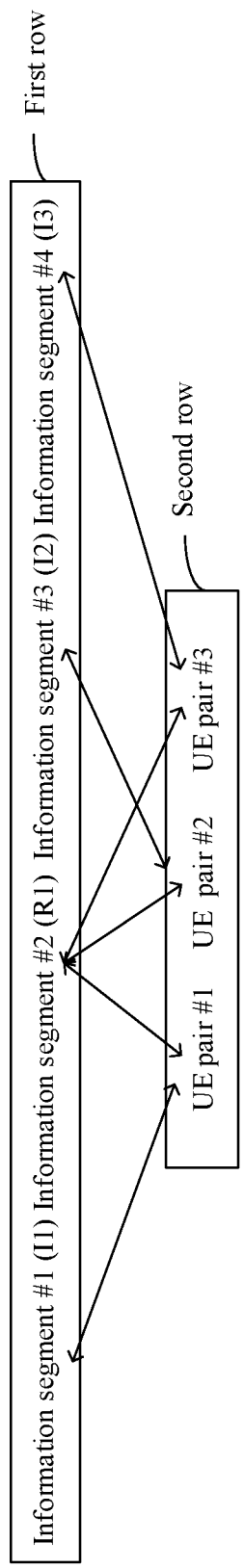
FIG. 17 is a schematic diagram of still another slot format according to this application.

FIG. 17 is a schematic diagram of still another slot format according to this application. The schematic diagram includes a first row and a second row. The first row is DCI, and the second row is different terminal device pairs.

It is assumed that there are three terminal device pairs in total in the sidelink communications system in the coverage of the network device, and the identifiers of the three terminal device pairs are respectively UE pair #1 to UE pair #3. In addition, all receiving terminal devices in the three terminal device pairs are R1, and four information segments carried in the DCI are respectively a block #1 to a block #4.

First, the network device scrambles the DCI by using C-RNTIs of the receiving terminal devices R1. In this case, when receiving the DCI, the terminal device can parse the DCI based on the C-RNTI.

Second, the network device determines a one-to-one correspondence between the four information segments and the four terminal devices, and notifies the terminal device of the one-to-one correspondence by using semi-static signaling. When receiving the DCI, the terminal device can obtain the corresponding block based on the one-to-one correspondence and the identifier of the terminal device.

As shown in FIG. 17, the DCI includes the following information:
(1) a DCI format identifier, where the DCI format identifier may occupy one or more bits; and
(2) a block #1 (SFI information of an initiating terminal device in a terminal device pair #1), a block #2 (SFI information of receiving terminal devices in the terminal device pair #1, the terminal device pair #2, and the terminal device pair #3), the block #3 (SFI information of an initiating terminal device in the terminal device pair #2), and the block #4 (SFI information of an initiating terminal device in the terminal device pair #3).

It should be understood that FIG. 17 shows merely an example, and a terminal device belonging to a plurality of terminal device pairs may be alternatively an initiating terminal device in the terminal device pairs. Details are not described herein.

With reference to FIG. 6 to FIG. 17, the foregoing describes in detail the sidelink communication method provided in the embodiments of this application. With reference to FIG. 18 to FIG. 21, the following describes in detail a sidelink communications apparatus provided in the embodiments of this application.

Figure 18:
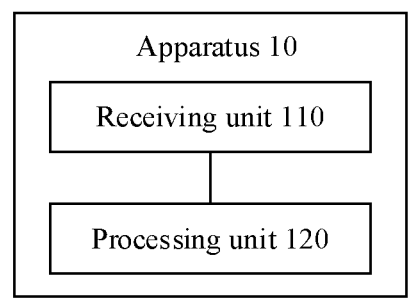
FIG. 18 is a schematic diagram of a sidelink communications apparatus 10 according to this application.

FIG. 18 is a schematic diagram of a sidelink communications apparatus 10 according to this application. As shown in FIG. 18, the apparatus 10 includes a receiving unit 110 and a processing unit 120.

The receiving unit 110 is configured to receive downlink control information sent by a network device. The downlink control information carries first indication information. The terminal device is any terminal device in K terminal device pairs. The first indication information is used to indicate slot formats respectively corresponding to terminal devices in the K terminal device pairs. The terminal device pair is two terminal devices performing sidelink communication. K is a positive integer.

The processing unit 120 is configured to parse the downlink control information.

The apparatus 10 corresponds to the terminal device in the method embodiment. The corresponding units of the apparatus 10 are configured to perform corresponding steps performed by the terminal device in the method embodiment shown in FIG. 6.

The receiving unit 110 in the apparatus 10 performs a receiving step in the method embodiment, for example, performs receiving of the downlink control information from the network device in FIG. 6. The processing unit 120 performs steps implemented or processed in the terminal device in the method embodiment, for example, performs parsing of the downlink control information in FIG. 6.

Optionally, the apparatus 10 may further include a sending unit 130, configured to send information to another device. The receiving unit 110 and the sending unit 130 may form a transceiver unit that has both receiving and sending functions. The processing unit 120 may be a processor. The receiving unit 110 may be a receiver. The sending unit 130 may be a transmitter. The receiver and the transmitter may be integrated into a transceiver.

Figure 19:
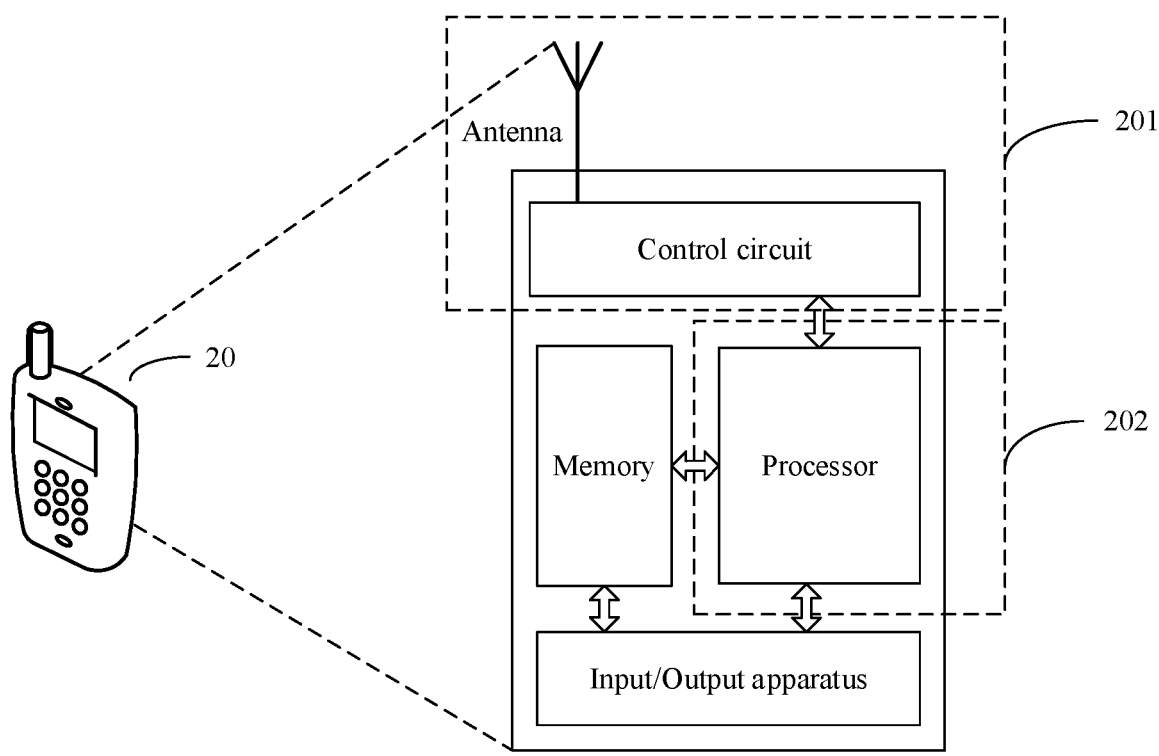
FIG. 19 is a schematic structural diagram of a terminal device 20 to which an embodiment of this application is applicable.

FIG. 19 is a schematic structural diagram of a terminal device 20 to which an embodiment of this application is applicable. The terminal device 20 may be applied to the system shown in FIG. 1. For ease of description, FIG. 19 shows merely main parts of the terminal device. As shown in FIG. 19, the terminal device 20 includes a processor, a memory, a control circuit, an antenna, and an input/output apparatus. The processor is configured to control the antenna and the input/output apparatus to receive and send signals. The memory is configured to store a computer program. The processor is configured to invoke the computer program from the memory and run the computer program, to perform corresponding procedures and/or operations performed by the terminal device in the sidelink communication method in this application. Details are not described herein again.

A person skilled in the art may understand that for ease of description, FIG. 19 shows only one memory and one processor. Actually, the terminal device may include a plurality of processors and a plurality of memories. The memory may also be referred to as a storage medium, a storage device, or the like. This is not limited in this embodiment of this application.

Figure 20:
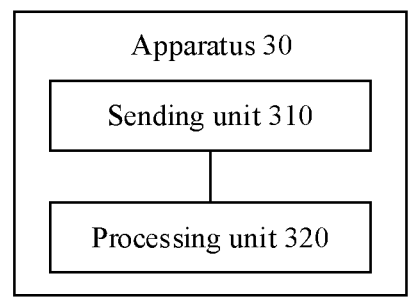
FIG. 20 is a schematic diagram of a sidelink communications apparatus 30 according to this application.

FIG. 20 is a schematic diagram of a sidelink communications apparatus 30 according to this application. As shown in FIG. 20, the apparatus 30 includes a sending unit 310 and a processing unit 320.

The processing unit 320 is configured to determine downlink control information. The downlink control information carries first indication information. The first indication information is used to indicate slot formats respectively corresponding to terminal devices in K terminal device pairs. The terminal device pair is two terminal devices performing sidelink communication. K is a positive integer.

The sending unit 310 is configured to send the downlink control information.

The apparatus 30 corresponds to the network device in the method embodiment. The corresponding units of the apparatus 30 are configured to perform corresponding steps performed by the network device in the method embodiment shown in FIG. 6.

The sending unit 310 in the apparatus 30 performs a sending step of the network device in the method embodiment, for example, performs step 120 of sending the downlink control information to the terminal device in FIG. 6. The processing unit 120 performs steps implemented or processed in the network device in the method embodiment, for example, performs step 110 of determining the downlink control information in FIG. 6.

Optionally, the apparatus 30 may further include a receiving unit 330, configured to receive information sent by another device. The receiving unit 330 and the sending unit 310 may form a transceiver unit that has both receiving and sending functionalities. The processing unit 320 may be a processor. The sending unit 310 may be a receiver. The receiving unit 330 may be a transmitter. The receiver and the transmitter may be integrated into a transceiver.

Figure 21:
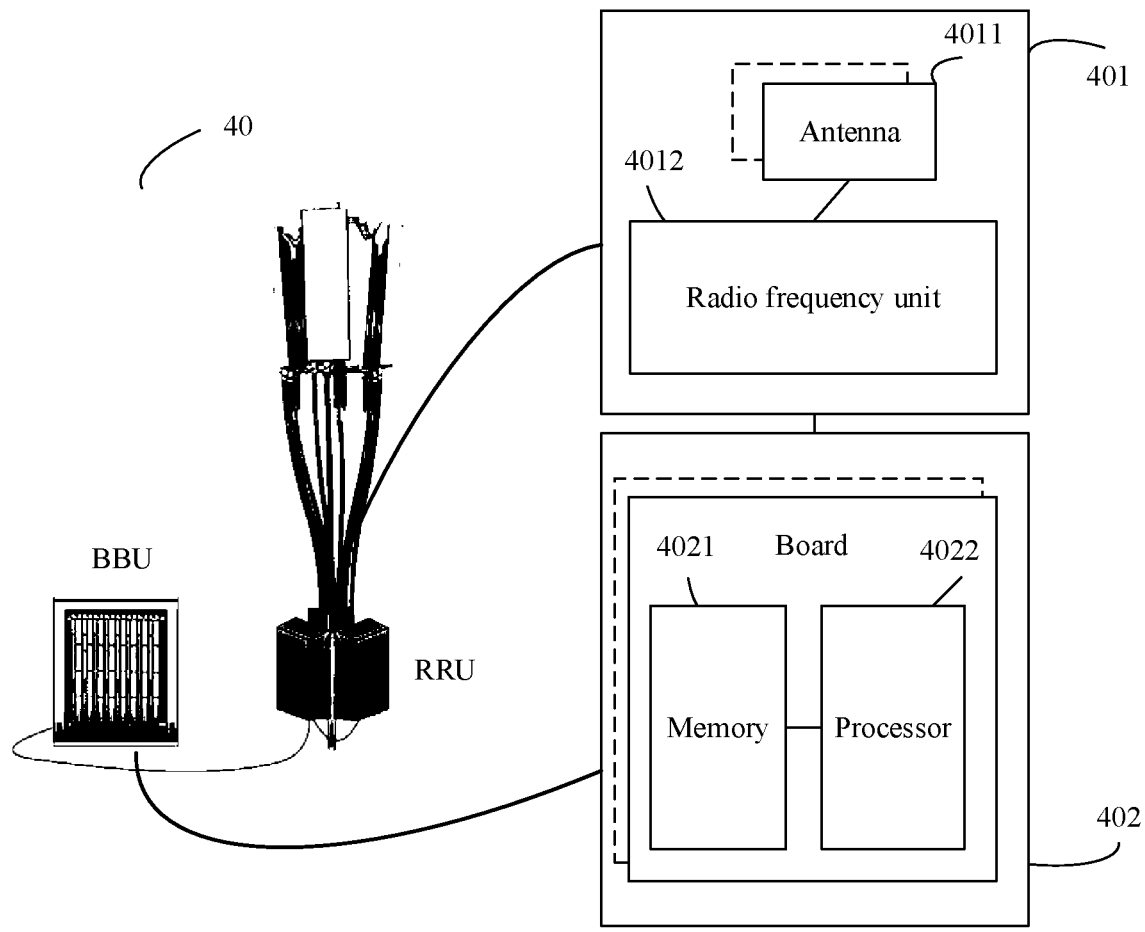
FIG. 21 is a schematic structural diagram of a network device 40 to which an embodiment of this application is applicable.

FIG. 21 is a schematic structural diagram of a network device 40 to which an embodiment of this application is applicable. The network device 40 may be configured to implement functions of the network device in the sidelink communication method. For example, FIG. 21 may be a schematic structural diagram of a base station. As shown in FIG. 21, the network device may be applied to the system shown in FIG. 1.

The network device 40 may include one or more radio frequency units, for example, remote radio units (RRU) 401 and one or more baseband units (BBU). The baseband unit may also be referred to as a digital unit (DU) 402. The RRU 401 may be referred to as a transceiver unit corresponding to the sending unit 310 in FIG. 20. Optionally, the transceiver unit 401 may further be referred to as a transceiver, a transceiver circuit, a transceiver, or the like, and may include at least one antenna 4011 and a radio frequency unit 4012. Optionally, the transceiver unit 401 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 401 is mainly configured to: receive and send a radio frequency signal, and perform conversion between a radio frequency signal and a baseband signal, for example, configured to send the control information in the foregoing embodiments to a terminal device. The BBU 402 is mainly configured to perform baseband processing, control a base station, and the like. The RRU 401 and the BBU 402 may be physically disposed together, or may be physically disposed separately, to be specific, may be on a distributed base station.

The BBU 402 is a control center of a network device, or may be referred to as a processing unit corresponding to the processing unit 320 in FIG. 20. The BBU 402 is mainly configured to implement a baseband processing function, for example, channel encoding, multiplexing, modulation, or spectrum spreading. For example, the BBU (the processing unit) 402 may be configured to control the network device 40 to perform an operation procedure of the network device in the method embodiment, for example, determine a symbol length for carrying the control information of the terminal device.

In an example, the BBU 402 may include one or more boards, and a plurality of boards may together support a radio access network (for example, an LTE system, or a 5G system) of a single access standard, or may separately support radio access networks of different access standards. The BBU 402 further includes a memory 4021 and a processor 4022. The memory 4021 is configured to store necessary instructions and data. For example, the memory 4021 stores a codebook and the like in the foregoing embodiments. The processor 4022 is configured to control the base station to perform a necessary action, for example, configured to control the base station to perform an operation procedure related to the network device in the foregoing method embodiment. The memory 4021 and the processor 4022 may serve one or more boards. In other words, a memory and a processor may be separately disposed on each board, or a plurality of boards may share the same memory and processor. In addition, a necessary circuit may be disposed on each board.

It should be understood that the network device 40 shown in FIG. 21 can implement functions related to the network device in the method embodiments in FIG. 6 to FIG. 17. Operations and/or functions of each unit of the network device 40 are respectively used to implement corresponding procedures performed by the network device in the foregoing method embodiments of this application. Detailed descriptions are properly omitted herein, to avoid repetition. The structure of the network device shown in FIG. 21 is merely a possible form, but shall not constitute any limitation on this embodiment of this application. In this application, a possibility that there may be a network device structure in another form in the future is not excluded.

An embodiment of this application further provides a communications system. The communications system includes the foregoing network device and one or more terminal devices.

This application further provides a computer readable storage medium. The computer readable storage medium stores an instruction. When the instruction is run on a computer, the computer is enabled to perform steps of the network device in the methods shown in FIG. 6 to FIG. 17.

This application further provides a computer readable storage medium. The computer readable storage medium stores an instruction. When the instruction is run on a computer, the computer is enabled to perform steps of the terminal device in the methods shown in FIG. 6 to FIG. 17.

This application further provides a computer program product including an instruction. When the computer program product is run on a computer, the computer is enabled to perform related steps performed by the network device in the methods shown in FIG. 6 to FIG. 17.

This application further provides a computer program product including an instruction. When the computer program product is run on a computer, the computer is enabled to perform related steps performed by the terminal device in the methods shown in FIG. 6 to FIG. 17.

This application further provides a chip including a processor. The processor is configured to read and run a computer program stored in a memory, to perform corresponding operations and/or procedures performed by the terminal device in the sidelink communication method provided in this application. Optionally, the chip further includes a memory. The memory is connected to the processor by using a circuit or a line. The processor is configured to read and perform the computer program in the memory. Further, optionally, the chip further includes a communications interface. The processor is connected to the communications interface. The communications interface is configured to receive to-be-processed data and/or information. The processor obtains the data and/or the information from the communications interface, and processes the data and/or the information. The communications interface may be an input/output interface.

This application further provides a chip including a processor. The processor is configured to invoke and run a computer program stored in a memory, to perform corresponding operations and/or procedures performed by the network device in the sidelink communication method provided in this application. Optionally, the chip further includes a memory. The memory is connected to the processor by using a circuit or a line. The processor is configured to read and perform the computer program in the memory. Further, optionally, the chip further includes a communications interface. The processor is connected to the communications interface. The communications interface is configured to receive to-be-processed data and/or information. The processor obtains the data and/or the information from the communications interface, and processes the data and/or the information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, and a digital-to-analog converter. The processor may allocate control and signal processing functions of the terminal device or the network device between these devices based on respective functions of the devices. In addition, the processor may have functions for operating one or more software programs, and the software programs may be stored in the memory. The functions of the processor may be implemented by hardware or may be implemented by executing corresponding software by hardware. The hardware or the software includes one or more modules corresponding to the foregoing functions.

The memory may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM), another compact disc storage or optical disc storage (including a compact disc, a laser disc, an optical disc, a digital versatile disc, a blue-ray optical disc, and the like), a magnetic disk storage medium or another magnetic storage device, or any other medium that can carry or store expected program code in a form of instructions or data structures and can be accessed by a computer.

Optionally, the memory and the processor in the foregoing embodiments may be physically independent units, or the memory may be integrated into the processor.

In the embodiments of this application, "at least one" indicates one or more, and "a plurality of" indicates two or more. The term "and/or" describes an association relationship for describing associated objects and represents that three relationships may exist. For example, A and/or B may represent the following three cases: Only A exists, both A and B exist, and only B exists. A or B may be singular or plural. The character "/" generally indicates an "or" relationship between the associated objects. "At least one of the following" or a similar expression thereof indicates any combination of these items, including any combination of a single item or a plurality of items. For example, at least one of a, b, and c may represent a, b, c, a and b, a and c, b and c, or a and b and c. a, b, and c may be singular or plural.

A person of ordinary skill in the art may be aware that units and algorithm steps described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, the disclosed system, apparatus and method may be implemented in other manners. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units as separate parts may not be physically separate. Parts displayed as units may not be physical units, to be specific, may be located in one position, or may be distributed on a plurality of network units. Some or all of the units may be selected based on actual requirements to achieve the objectives of the technical solutions of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods according to the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope in the embodiment of this application. The protection scope of this application shall be subject to the protection scope of the claims.

What is claimed is:

1. A method, comprising:
   receiving, by a terminal device, downlink control information from a network device, wherein the downlink control information carries first indication information, the terminal device is one terminal device in K terminal device pairs, the first indication information indicates slot formats respectively corresponding to terminal devices in the K terminal device pairs, each terminal device pair comprises two terminal devices performing sidelink communication, and K is a positive integer, wherein a one-to-one correspondence between K information segments and the K terminal device pairs is either preconfigured or comprised in a second message received by the terminal device; and
   parsing, by the terminal device, the downlink control information.

2. The method according to claim 1, wherein
   the first indication information comprises N information segments, each information segment indicates a slot format corresponding to at least one terminal device in one of the K terminal device pairs, the N information segments are in a one-to-one correspondence with N terminal devices, and N is a positive integer.

3. The method according to claim 2, wherein that each information segment indicates a slot format corresponding to at least one terminal device in one terminal device pair comprises:
   each information segment indicates a slot format corresponding to an initiating terminal device in a terminal device pair;
   an information segment indicates a slot format corresponding to a receiving terminal device in a terminal device pair; or
   an information segment indicates a slot format corresponding to an initiating terminal device and a slot format corresponding to a receiving terminal device in a terminal device pair.

4. The method according to claim 3, wherein that an information segment indicates a slot format corresponding to an initiating terminal device and a slot format corresponding to a receiving terminal device in a terminal device pair comprises that
   the information segment comprises a first part and a second part, wherein the first part indicates the slot format corresponding to the initiating terminal device, and the second part indicates the slot format corresponding to the receiving terminal device.

5. The method according to claim 1, wherein before the receiving, by a terminal device, downlink control information from a network device, the method further comprises:
   obtaining, by the terminal device, a first identifier, wherein the first identifier scrambles the downlink control information, and
   the first identifier is preconfigured, or the terminal device receives semi-static signaling from the network device, wherein the semi-static signaling carries the first identifier.

6. The method according to claim 1, wherein the downlink control information further comprises second indication information, and the second indication information identifies the K terminal device pairs.

7. An apparatus, comprising:
   a memory storage comprising instructions; and
   one or more processors in communication with the memory storage, wherein execution of the instructions by the one or more processors causes the apparatus to:
   determine downlink control information, wherein the downlink control information carries first indication information, the first indication information indicates slot formats respectively corresponding to terminal devices in K terminal device pairs, a terminal device pair is two terminal devices performing sidelink communication, and K is a positive integer, wherein a one-to-one correspondence between K information segments and the K terminal device pairs is either preconfigured or comprised in a second message sent by the apparatus; and
   send the downlink control information.

8. The apparatus according to claim 7, wherein
   the first indication information comprises N information segments, each information segment indicates a slot format corresponding to at least one terminal device in one of the K terminal device pairs, the N information segments are in a one-to-one correspondence with N terminal devices, and N is a positive integer.

9. The apparatus according to claim 8, wherein that each information segment indicates a slot format corresponding to at least one terminal device in one terminal device pair comprises:
   each information segment indicates a slot format corresponding to an initiating terminal device in a terminal device pair;
   each information segment indicates a slot format corresponding to a receiving terminal device in a terminal device pair; or
   each information segment indicates a slot format corresponding to an initiating terminal device and a slot format corresponding to a receiving terminal device in a terminal device pair.

10. The apparatus according to claim 9, wherein that an information segment indicates a slot format corresponding to an initiating terminal device and a slot format corresponding to a receiving terminal device in a terminal device pair comprises that
    the information segment comprises a first part and a second part, wherein the first part indicates the slot format corresponding to the initiating terminal device, and the second part indicates the slot format corresponding to the receiving terminal device.

11. The apparatus according to claim 7, wherein the downlink control information further comprises second indication information, and the second indication information identifies the K terminal device pairs.

12. An apparatus, comprising:
a memory storage comprising instructions; and
one or more processors in communication with the memory storage, wherein execution of the instructions by the one or more processors causes the apparatus to:
receive downlink control information from a network device, wherein the downlink control information carries first indication information, the terminal device is any terminal device in K terminal device pairs, the first indication information indicates slot formats respectively corresponding to terminal devices in the K terminal device pairs, a terminal device pair is two terminal devices performing sidelink communication, and K is a positive integer, wherein a one-to-one correspondence between the K information segments and the K terminal device pairs is either preconfigured or comprised in a second message received by the apparatus; and
parse the downlink control information.

13. The apparatus according to claim 12, wherein
the first indication information comprises N information segments, an information segment indicates a slot format corresponding to at least one terminal device in one terminal device pair, the N information segments are in a one-to-one correspondence with N terminal devices, and N is a positive integer.

14. The apparatus according to claim 13, wherein that each information segment indicates a slot format corresponding to at least one terminal device in one terminal device pair comprises:

each information segment indicates a slot format corresponding to an initiating terminal device in a terminal device pair;
each information segment indicates a slot format corresponding to a receiving terminal device in a terminal device pair; or
each information segment indicates a slot format corresponding to an initiating terminal device and a slot format corresponding to a receiving terminal device in a terminal device pair.

15. The apparatus according to claim 14, wherein that an information segment indicates a slot format corresponding to an initiating terminal device and a slot format corresponding to a receiving terminal device in a terminal device pair comprises that
the information segment comprises a first part and a second part, wherein the first part indicates the slot format corresponding to the initiating terminal device, and the second part indicates the slot format corresponding to the receiving terminal device.

16. The apparatus according to claim 12, wherein before the apparatus receives the downlink control information from the network device, the apparatus is further configured to obtain a first identifier, wherein the first identifier scrambles the downlink control information; and
the first identifier is preconfigured, or the apparatus receives semi-static signaling from the network device, wherein the semi-static signaling carries the first identifier.

17. The apparatus according to claim 12, wherein the downlink control information further comprises second indication information, and the second indication information identifies the K terminal device pairs.

* * * * *